(12) United States Patent
Crofton et al.

(10) Patent No.: US 11,100,107 B2
(45) Date of Patent: Aug. 24, 2021

(54) SYSTEMS AND METHODS FOR SECURE FILE MANAGEMENT VIA AN AGGREGATION OF CLOUD STORAGE SERVICES

(71) Applicant: Carbonite, Inc., Boston, MA (US)

(72) Inventors: Teo Winton Crofton, Sudbury, MA (US); David Raissipour, Westborough, MA (US)

(73) Assignee: Carbonite, Inc., Boston, MA (US)

( * ) Notice: Subject to any disclaimer, the term of this patent is extended or adjusted under 35 U.S.C. 154(b) by 473 days.

(21) Appl. No.: 15/156,014

(22) Filed: May 16, 2016

(65) Prior Publication Data

US 2017/0329677 A1   Nov. 16, 2017

(51) Int. Cl.
*G06F 16/00* (2019.01)
*G06F 16/2455* (2019.01)
(Continued)

(52) U.S. Cl.
CPC ........ *G06F 16/2455* (2019.01); *G06F 16/178* (2019.01); *G06F 21/6227* (2013.01);
(Continued)

(58) Field of Classification Search
CPC .. G06F 16/178; G06F 21/6218; G06F 16/182; G06F 16/1844; G06F 16/14;
(Continued)

(56) References Cited

U.S. PATENT DOCUMENTS

| 6,061,695 A | 5/2000 | Slivka et al. |
| 7,454,446 B2 | 11/2008 | Leung et al. |

(Continued)

FOREIGN PATENT DOCUMENTS

| DE | 2017 002 497 | 3/2019 |
| EP | 2 746 940 | 6/2014 |

(Continued)

OTHER PUBLICATIONS

CloudGOO, "Add as many cloud drives as you need." Sqoup LLC, published by at least Mar. 17, 2016.

(Continued)

*Primary Examiner* — Debbie M Le
(74) *Attorney, Agent, or Firm* — Sprinkle IP Law Group

(57) ABSTRACT

The present disclosure describes systems and methods for aggregation and management of cloud storage among a plurality of providers via file fragmenting to provide increased reliability and security. In one implementation, fragments or blocks may be distributed among a plurality of cloud storage providers, such that no provider retains a complete copy of a file. Accordingly, even if an individual service is compromised, a malicious actor cannot access the data. In another implementation, fragments may be duplicated and distributed to multiple providers, such that loss of communications to any one provider does not result in inability to access the data. This implementation may be combined with error correction techniques to allow recovery, even with loss of multiple providers. File synchronization may also be faster in these implementations by dividing reading and writing operations among multiple providers.

17 Claims, 23 Drawing Sheets

(51) Int. Cl.
  *G06F 21/62* (2013.01)
  *H04L 29/08* (2006.01)
  *G06F 16/178* (2019.01)
  *G06F 11/14* (2006.01)

(52) U.S. Cl.
  CPC ...... *H04L 67/1095* (2013.01); *G06F 11/1446* (2013.01); *G06F 2201/84* (2013.01)

(58) Field of Classification Search
  CPC ............. G06F 16/278; G06F 15/17331; G06F 16/1873; H04L 67/1097; H04L 67/10; H04L 63/0428
  See application file for complete search history.

(56) References Cited

U.S. PATENT DOCUMENTS

| | | | |
|---|---|---|---|
| 8,335,807 B1 | 12/2012 | Cerda, Jr. et al. | |
| 8,650,159 B1 | 2/2014 | Zhang et al. | |
| 8,725,891 B2 | 5/2014 | Seago et al. | |
| 8,813,225 B1 | 8/2014 | Fuller et al. | |
| 8,825,597 B1* | 9/2014 | Houston | G06F 16/10 |
| | | | 707/610 |
| 9,128,626 B2 | 9/2015 | Chacko | |
| 9,158,927 B1 | 10/2015 | Franklin et al. | |
| 9,274,956 B1 | 3/2016 | Salyers et al. | |
| 9,558,202 B2* | 1/2017 | Lockhart | G06F 16/178 |
| 9,678,968 B1 | 6/2017 | Taylor et al. | |
| 9,712,854 B2 | 7/2017 | Steiner et al. | |
| 9,818,127 B2 | 11/2017 | Lyoob et al. | |
| 9,904,599 B2 | 2/2018 | Yin et al. | |
| 9,934,241 B2* | 4/2018 | Duval | G06F 16/178 |
| 10,031,916 B2 | 7/2018 | Cox et al. | |
| 10,116,629 B2 | 10/2018 | Crofton et al. | |
| 10,264,072 B2 | 4/2019 | Crofton et al. | |
| 10,356,158 B2 | 7/2019 | Crofton et al. | |
| 10,404,798 B2 | 9/2019 | Crofton et al. | |
| 10,848,560 B2 | 11/2020 | Crofton et al. | |
| 10,979,489 B2 | 4/2021 | Crofton et al. | |
| 2002/0174010 A1 | 11/2002 | Rice | |
| 2004/0044698 A1 | 3/2004 | Ebata | |
| 2005/0044198 A1 | 2/2005 | Okitsu et al. | |
| 2005/0251500 A1 | 11/2005 | Vahalia et al. | |
| 2007/0038822 A1 | 2/2007 | Correl | |
| 2007/0038857 A1 | 2/2007 | Gosnell | |
| 2007/0079068 A1 | 4/2007 | Draggon | |
| 2007/0091920 A1 | 4/2007 | Harris et al. | |
| 2007/0220029 A1 | 9/2007 | Jones et al. | |
| 2009/0077097 A1 | 3/2009 | Lacapra et al. | |
| 2009/0265391 A1 | 10/2009 | Dai et al. | |
| 2009/0271412 A1 | 10/2009 | Lacapra et al. | |
| 2010/0274772 A1 | 10/2010 | Samuels | |
| 2010/0325199 A1 | 12/2010 | Park et al. | |
| 2010/0332401 A1 | 12/2010 | Prahlad et al. | |
| 2010/0332454 A1 | 12/2010 | Prahlad et al. | |
| 2011/0167221 A1 | 7/2011 | Pangal et al. | |
| 2012/0047339 A1 | 2/2012 | Decasper et al. | |
| 2012/0102291 A1 | 4/2012 | Cherian et al. | |
| 2012/0185437 A1 | 7/2012 | Pavlov et al. | |
| 2012/0215771 A1 | 8/2012 | Steiner | |
| 2012/0330954 A1 | 12/2012 | Sivasubramanian et al. | |
| 2013/0018928 A1 | 1/2013 | Lacapra et al. | |
| 2013/0036363 A1 | 2/2013 | Johnson | |
| 2013/0039542 A1 | 2/2013 | Guzik | |
| 2013/0067090 A1 | 3/2013 | Batrouni et al. | |
| 2013/0110778 A1 | 5/2013 | Taylor et al. | |
| 2013/0110779 A1 | 5/2013 | Taylor et al. | |
| 2013/0212373 A1 | 8/2013 | Dodgson et al. | |
| 2013/0227047 A1 | 8/2013 | Dolce | |
| 2013/0272609 A1 | 10/2013 | Sun et al. | |
| 2013/0275695 A1 | 10/2013 | Ponsford et al. | |
| 2014/0006350 A1 | 1/2014 | Fukui et al. | |
| 2014/0006581 A1 | 1/2014 | Raghu | |
| 2014/0006858 A1 | 1/2014 | Helfman et al. | |
| 2014/0019680 A1 | 1/2014 | Jin et al. | |
| 2014/0081989 A1* | 3/2014 | Chang | G06F 11/2058 |
| | | | 707/748 |
| 2014/0095650 A1 | 4/2014 | Resch et al. | |
| 2014/0136496 A1 | 5/2014 | Kuo | |
| 2014/0181443 A1 | 6/2014 | Kottomtharayil et al. | |
| 2014/0201541 A1 | 7/2014 | Paul et al. | |
| 2014/0282851 A1 | 9/2014 | Miller et al. | |
| 2014/0297700 A1 | 10/2014 | Vongsouvanh et al. | |
| 2015/0006475 A1 | 1/2015 | Guo et al. | |
| 2015/0006596 A1 | 1/2015 | Fukui et al. | |
| 2015/0032978 A1 | 1/2015 | Bashyam et al. | |
| 2015/0052105 A1 | 2/2015 | Nguyen | |
| 2015/0154418 A1 | 6/2015 | Redberg | |
| 2015/0186538 A1 | 7/2015 | Yan et al. | |
| 2015/0293984 A1 | 10/2015 | Zolotusky | |
| 2015/0373109 A1 | 12/2015 | Cox et al. | |
| 2016/0019636 A1 | 1/2016 | Adapalli et al. | |
| 2016/0127339 A1 | 5/2016 | Childs et al. | |
| 2016/0132529 A1 | 5/2016 | Acharya | |
| 2016/0182620 A1 | 6/2016 | Ukai et al. | |
| 2016/0217176 A1 | 7/2016 | Haviv et al. | |
| 2016/0224609 A1 | 8/2016 | Seekircher et al. | |
| 2016/0277497 A1 | 9/2016 | Bannister et al. | |
| 2016/0315887 A1 | 10/2016 | Uraizee et al. | |
| 2016/0321287 A1 | 11/2016 | Luthra et al. | |
| 2016/0323381 A1* | 11/2016 | Huang | H04L 67/1097 |
| 2016/0350551 A1* | 12/2016 | Chang | G06F 12/1408 |
| 2017/0046531 A1 | 2/2017 | Roberts | |
| 2017/0048021 A1 | 2/2017 | Yanovsky et al. | |
| 2017/0091047 A1 | 3/2017 | Bangalore et al. | |
| 2017/0177638 A1 | 6/2017 | Bhosale | |
| 2017/0180394 A1 | 6/2017 | Crofton et al. | |
| 2017/0212910 A1 | 7/2017 | Morris et al. | |
| 2017/0249328 A1 | 8/2017 | Liang et al. | |
| 2017/0251260 A1 | 8/2017 | Sanders | |
| 2017/0286436 A1 | 10/2017 | Neporada et al. | |
| 2017/0286710 A1 | 10/2017 | Cheung et al. | |
| 2017/0302678 A1 | 10/2017 | Borlick et al. | |
| 2017/0329677 A1 | 11/2017 | Crofton et al. | |
| 2017/0331796 A1 | 11/2017 | Crofton et al. | |
| 2017/0331880 A1 | 11/2017 | Crofton et al. | |
| 2017/0331892 A1 | 11/2017 | Crofton et al. | |
| 2017/0331893 A1 | 11/2017 | Crofton et al. | |
| 2018/0011874 A1 | 1/2018 | Lacapra et al. | |
| 2019/0036891 A1 | 1/2019 | Crofton et al. | |
| 2019/0260821 A1 | 8/2019 | Crofton et al. | |
| 2019/0306240 A1 | 10/2019 | Crofton et al. | |
| 2021/0075857 A1 | 3/2021 | Crofton et al. | |
| 2021/0112114 A1 | 4/2021 | Crofton et al. | |

FOREIGN PATENT DOCUMENTS

| | | |
|---|---|---|
| GB | 2564973 | 1/2019 |
| WO | 2017200881 | 11/2017 |

OTHER PUBLICATIONS odrive Sync, "Sync unlimited cloud storage." Odrive, published by at least Mar. 17, 2016.
International search Report and Written Opinion on PCT/US2017/032536 dated Jul. 4, 2017 (115 pages).
U.S. Appl. No. 15/156,031, Notice of Allowance dated Dec. 28, 2018, pp. 1-12.
U.S. Appl. No. 15/156,042, Office Action Communication dated Oct. 18, 2018, pp. 1-12.
U.S. Appl. No. 15/155,998, Office Action Communication dated Sep. 19, 2018, pp. 1-12.
U.S. Appl. No. 15/155,998, Notice of Allowance dated Mar. 27, 2019, pp. 1-9.
U.S. Appl. No. 15/155,998, Office Action Communication dated Dec. 22, 2017, pp. 1-14.
U.S. Appl. No. 15/155,998, Office Action Communication dated Jun. 15, 2018, pp. 1-12.
U.S. Appl. No. 15/156,031, Office Action Communication dated Jun. 11, 2018, pp. 1-22.
U.S. Appl. No. 15/156,042, Office Action Communication dated Dec. 22, 2017, pp. 1-14.

(56) References Cited

OTHER PUBLICATIONS

U.S. Appl. No. 15/156,042, Office Action Communication dated Jul. 12, 2018, pp. 1-13.
PCT/US2017/032536, International Preliminary Report on Patentability and Written Opinion dated Nov. 20, 2018, pp. 1-7.
U.S. Appl. No. 15/156,042, Notice of Allowance dated May 20, 2019, pp. 1-12.
U.S. Appl. No. 16/400,058, Office Action Communication dated Oct. 10, 2019, pp. 1-12.
Office Action issued for U.S. Appl. No. 16/145,269, dated Jan. 9, 2020, 22 pages.
Advisory Action issued for U.S. Appl. No. 15/155,998, dated Aug. 28, 2018, 3 pages.
Advisory Action issued for U.S. Appl. No. 15/156,042 dated Sep. 4, 2018, 4 pages.
Office Action issued for U.S. Appl. No. 15/155,998, dated Dec. 22, 2017, 14 pages.
Office Action issued for U.S. Appl. No. 16/400,058, dated Mar. 31, 2020, 13 pages.
Office Action issued for U.S. Appl. No. 15/156,025, dated Jan. 24, 2018, 19 pages.
Office Action issued for U.S. Appl. No. 15/156,025, dated Jul. 13, 2018, 14 pages.
Notice of Allowance issued for U.S. Appl. No. 16/145,269, dated Apr. 29, 2020, 9 pages.
Office Action issued for U.S. Appl. No. 16/444,178, dated Jul. 7, 2020, 12 pages.
Notice of Allowance issued for U.S. Appl. No. 16/400,058, dated Aug. 17, 2020, 9 pages.
Examination Report issued for GB1813024.5, dated Apr. 26, 2021, 2 pages.

* cited by examiner

SYSTEMS AND METHODS FOR SECURE FILE MANAGEMENT VIA AN AGGREGATION OF CLOUD STORAGE SERVICES

FIELD

The present application relates to systems and methods for aggregation of storage from a plurality of cloud storage providers.

BACKGROUND

Cloud storage providers provide network storage for users, frequently for free or at a low monthly cost. Such storage is typically limited in size (e.g. 5 or 10 GB). Accordingly, many users have multiple accounts with providers, backing up or synchronizing files from a single device to a plurality of services. Each of these providers typically require a separate client application to be running on the user's device, and monitor a single folder (and sub-folders) for synchronization to cloud storage. As a result, users need to manually manage synchronization between different providers and remember where files are stored. In particular, users must manually manage file storage among providers in cases where storage capacity has been exceeded, or to reserve free space for large files.

SUMMARY

The present disclosure describes systems and methods for aggregation and management of cloud storage among a plurality of providers. In a first aspect, the invention is directed to file distribution and management across multiple cloud services via a storage manager. The storage manager may aggregate third-party cloud storage provider accounts into a single cloud storage space and load balance files among the third party-accounts as necessary. In one implementation, the storage manager may act as an intermediary, and files may be transferred by the client to the storage manager, which may select and forward the files to a third-party storage provider. File retrieval may be performed similarly, with the client requesting a file from the intermediary storage manager, which may retrieve the file from the corresponding third-party storage provider and forward the file to the client device.

In another implementation, the storage manager may not be an intermediary for file transfers, and instead may merely provide instructions to client applications to store or retrieve files from corresponding storage providers. In such implementations, file metadata may be stored at the storage manager, along with identifications of which third-party provider is used for synchronization of each file.

In another aspect, aggregation of third-party cloud storage into a single virtual storage device can be enhanced via file fragmenting to provide increased reliability and security. In one implementation, fragments or blocks may be distributed among a plurality of cloud storage providers, such that no provider retains a complete copy of a file. Accordingly, even if an individual service is compromised, a malicious actor cannot access the data.

In another implementation, fragments may be duplicated and distributed to multiple providers, such that loss of communications to any one provider does not result in inability to access the data. This implementation may be combined with error correction techniques to allow recovery, even with loss of multiple providers. File synchronization may also be faster in these implementations by dividing reading and writing operations among multiple providers.

In a further aspect, aggregation of third-party cloud storage into a single virtual storage device can be enhanced via file fragmenting in a non-standard method (e.g. using a comb filter to divide the data bytestream) such that file headers and metadata are divided across separate fragments. For example, files normally stored as blocks of data having a width and height and read row by row, left to right, may be instead fragmented by reading the data column by column, left to right. The header of the file, typically taking up the first few lines of data, may be split across multiple fragments, obfuscating the original file metadata.

Some third-party cloud storage services provide enhanced features for certain types of files, such as geolocation, image analysis and tagging, facial recognition, image processing, etc. These features may be performed automatically on files of the corresponding type when synchronized to the cloud storage service.

Accordingly, in another aspect of the present disclosure, to leverage processing provided by a cloud provider with aggregation of cloud storage services, files may be pipelined to the processing provider and then resynchronized to an alternate storage service, with processing or metadata retained. In one implementation, files may be provided for processing, retrieved, and then separately provided for storage. In another implementation, files may be simultaneously provided for processing and storage at different cloud storage providers. After processing, the metadata of the file may be retrieved, and the file deleted from storage of the processing provider. The metadata may be synchronized with the stored file, or may be retained in metadata storage and retrieved by the client device during synchronization or file retrieval operations.

Similarly, some cloud storage providers provide additional benefits for storing certain files via their service. For example, some providers may allow users to store some types of files for free, without counting the files against a storage quota or limit, such as photos. Other providers may allow users to store music files, and may automatically replace lower quality recordings with high quality versions (improving quality for the user while performing deduplication and storage mitigation by the server).

In another aspect of the present disclosure, these policies may be utilized by a storage manager to direct corresponding types of files to specific storage providers to take advantage of free storage or further processing. The files may be excluded from load balancing algorithms, such that storage quotas are not unbalanced as a result of policies of one provider.

BRIEF DESCRIPTION OF THE FIGURES

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Figure 1A:
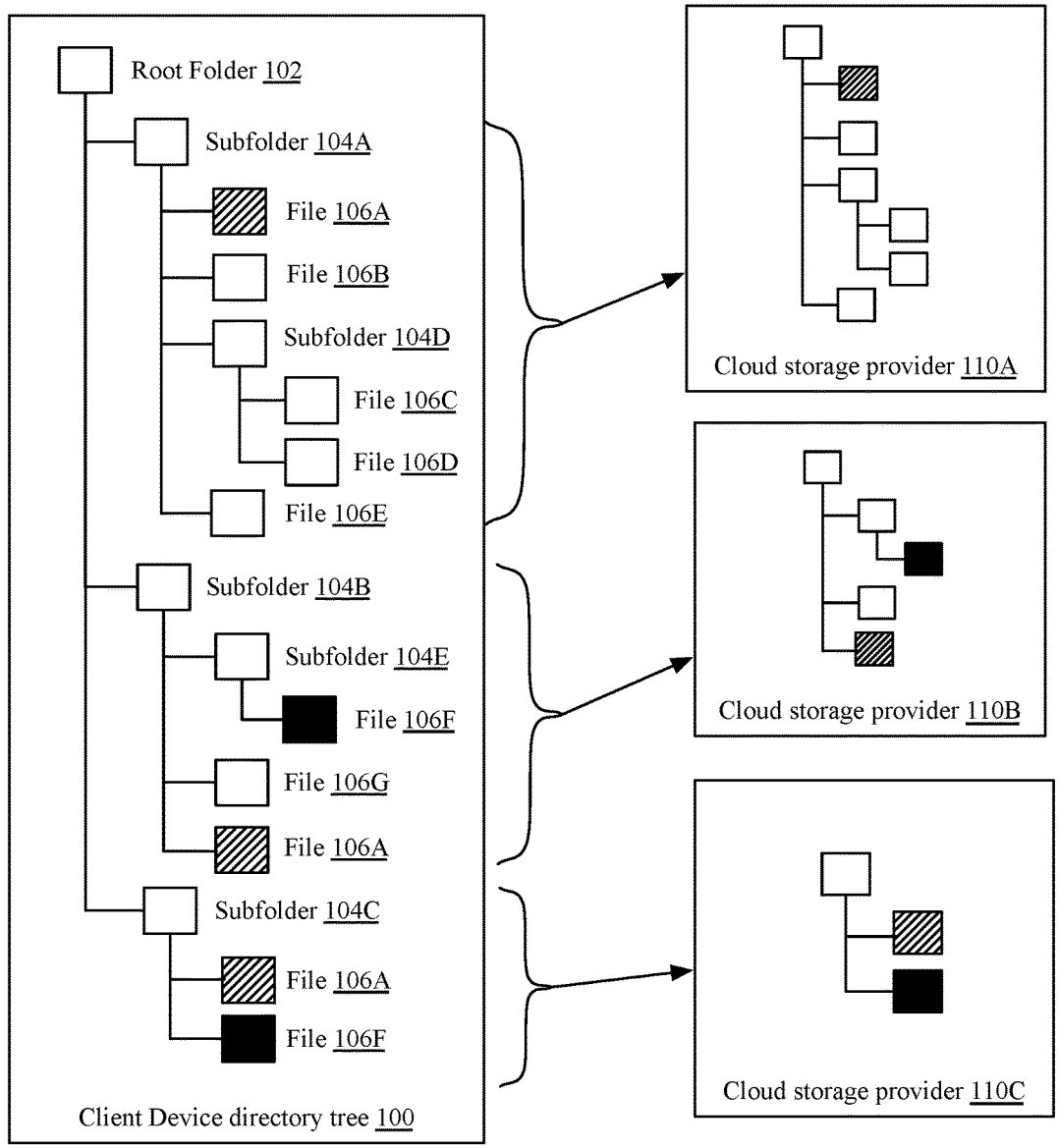
FIG. 1A is an illustration of use of a plurality of cloud storage services by a client computing device, in one implementation.

Cloud storage providers provide network storage for users, typically limited in size. Different providers also apply different policies to files (e.g. allowing unlimited storage of certain types of files, such as photos or music; or not allowing compressed or executable files to be stored), and may also provide different functions such as sharing with other users of the same service. To store additional data or take advantage of these various features and policies, many users have multiple accounts with providers, backing up or synchronizing files from a single device to a plurality of services. Each of these providers typically require a separate client application to be running on the user's device, and monitor a single folder (and sub-folders) for synchronization to cloud storage. For example, referring to FIG. 1A, illustrated is use of a plurality of cloud storage services by a client computing device, in one implementation. As shown, a client device may include a directory tree 100 including files and enclosing folders. For example, a device may include a root folder 102, which may store a plurality of subfolders 104A-104C (referred to generally as subfolder(s) 104 or monitored subfolders 104), each associated with one of a corresponding plurality of cloud storage providers 110A-110C (referred to generally as cloud storage provider(s) or service(s) 110). As shown, each monitored subfolder 104 may include one or more files 106A-106G (referred to generally as file(s) 106), which may themselves be in one or more subfolders 104D-104E. Although referred to as a root folder 102, in many implementations, root folder 102 may comprise a user folder, documents folder, or other such folder that, itself, may be within other folders within the directory tree. Additionally, although illustrated within root folder 102, in many implementations, monitored subfolders 104 may be in different positions within the tree, including within separate subfolders and/or at different depths of the tree.

An application or client agent for each cloud storage provider 110 may be executed by the client device, each monitoring files in the designated monitored subfolder 104A-104C and controlling synchronization of files to the corresponding cloud storage provider 110. As shown, in many implementations, the same files may be stored in multiple monitored subfolders (e.g. file 106A, file 106F), and transferred to corresponding providers. For example, a user may intentionally place the same file in different monitored subfolders for reliability, in case one cloud storage provider fails, or to take advantage of different features provided by different providers; the user may accidentally place the file in different monitored subfolders (for example, if they've forgotten previously storing a copy in one sub-folder); or a device of the user may be configured to automatically place a file in different monitored subfolders (e.g. pictures taken by a smart phone may be automatically transferred to a plurality of cloud storage providers, resulting in multiple copies on other synchronized devices).

As a result of this complexity, users may need to manually manage synchronization between different providers and remember where files are stored. Users may also need to manually transfer files and folders between monitored subfolders in cases where storage capacity of one provider has been exceeded or is approaching capacity, or to reserve free space for large files. For example, if the user has two cloud storage accounts, one of which has 1 GB of free space and the other of which has 2 GB of free space, the user may be able to store a 3 GB file within their total cloud space, but may have to transfer files from one storage provider to another in order to concatenate the free space into a single contiguous block.

Accordingly, the present disclosure describes systems and methods for aggregation and management of cloud storage among a plurality of providers. In a first aspect, the invention is directed to file distribution and management across multiple cloud services via a storage manager. The storage manager may aggregate third-party cloud storage provider accounts into a single cloud storage space and load balance files among the third party-accounts as necessary.

Figure 1B:
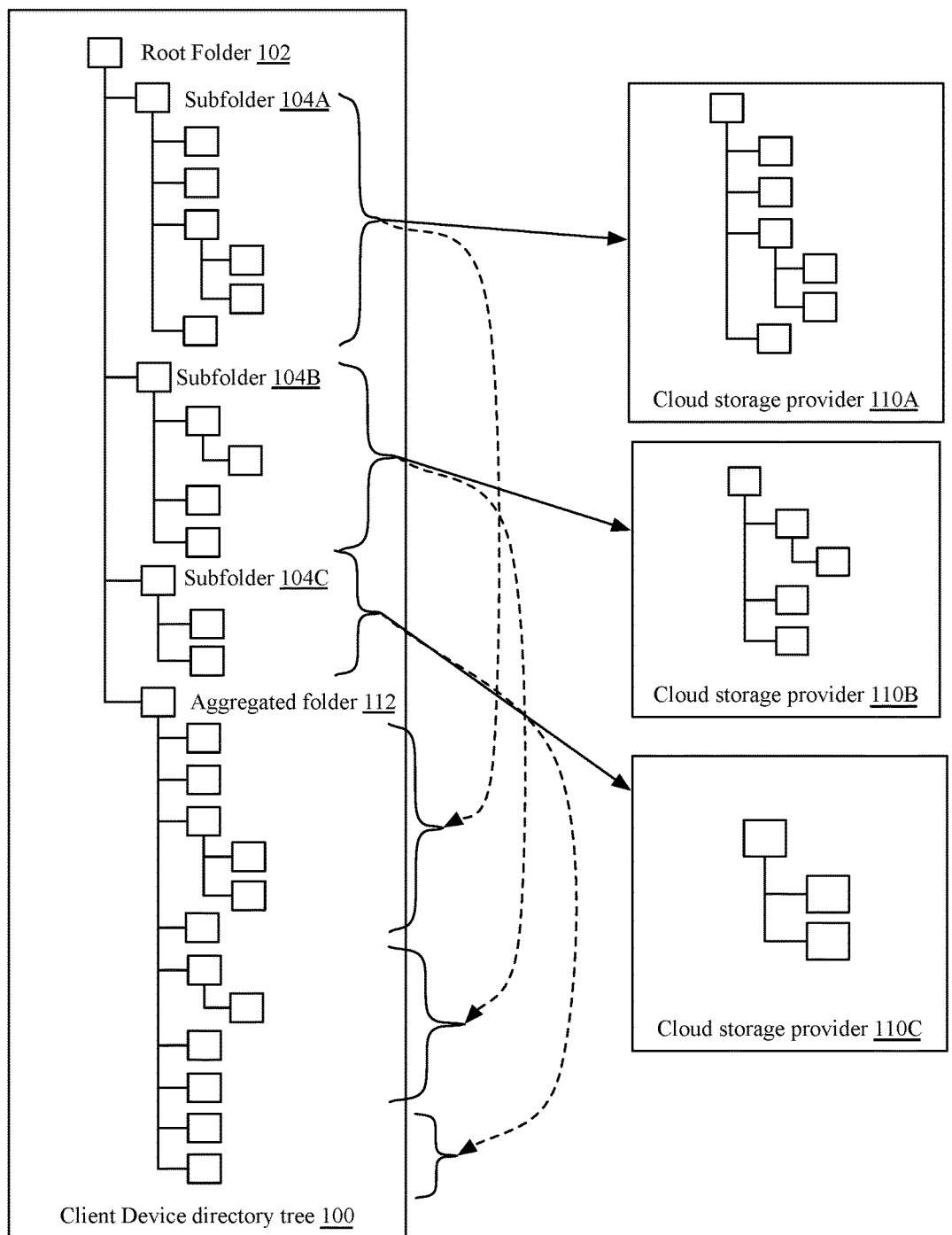
FIG. 1B is an illustration of aggregation of the plurality of cloud storage services by the client computing device of FIG. 1A, in another implementation.

FIG. 1B is an illustration of an implementation of aggregation of the plurality of cloud storage services by the client computing device of FIG. 1A. In some implementations, a synchronization or aggregation client on the client computing device may maintain an aggregated folder 112, which may store a copy or shadow copy of the contents of monitored subfolders 104A-104C. For example, in one implementation, the aggregated folder 112 may comprise aliases, shortcuts, or symlinks of folders or files in the monitored subfolders 104A-104C. The monitored subfolders 104A-104C may be hidden from the user, but retained so that monitoring and synchronization applications of cloud storage providers 110A-110C may operate normally, without modification. Accordingly, the user may see only a single folder containing all of their aggregated cloud storage files and folders.

In some implementations, the aggregation or synchronization client may remove duplicate files stored in multiple monitored subfolders. In other implementations, the aggregation or synchronization client may show a single symlink or shortcut within the aggregated folder 112, but may have it reference multiple corresponding files or folders in different monitored subfolders 104A-104C, for example, for increased reliability or high availability should a storage provider fail. In a similar implementation, files and folders may be stored in aggregated folder 112, and shortcuts or symlinks provided in monitored subfolders 104A-104C. This may provide easier duplication of files in multiple monitored subfolders, as each symlink need only reference a single file.

In other implementations, aggregated folder 112 may be provided by a user interface or GUI separate from or in place of a file explorer or directory structure provided by an operating system. For example, some smart phones or tablets do not provide direct user access to file directory management. On such devices, in some implementations, the aggregation or synchronization client may provide a user interface showing the contents of files and folders stored in the aggregated cloud storage services.

As discussed above, by aggregating folders and files into a single aggregated folder 112, an aggregation client may manage storage invisibly to the user, moving files or symlinks between monitored subfolders to trigger cloud storage applications to synchronize or delete files, adjusting and load balancing storage among the cloud storage providers as necessary.

Computing Environment

Figure 2A:
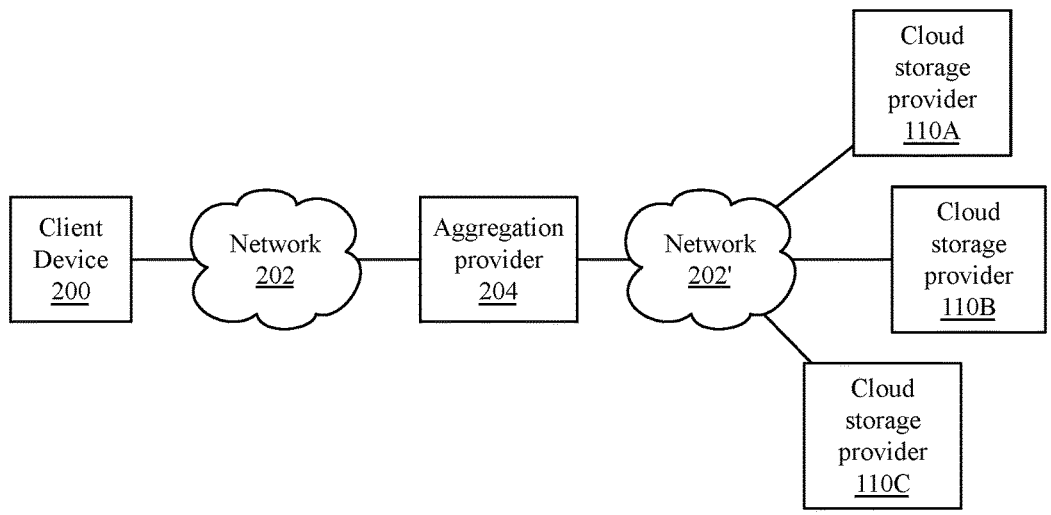
FIG. 2A is a block diagram of a computing environment for aggregation of a plurality of cloud storage services via an intermediary aggregation provider, according to one implementation.

FIG. 2A is a block diagram of a computing environment for aggregation of a plurality of cloud storage services via an intermediary aggregation provider, according to one implementation. A client device 200 may communicate with a plurality of storage providers 110 via one or more networks 202, 202'. An aggregation provider 204, sometimes referred to as a storage manager or aggregation manager, may be executed in some implementations by a second computing device. In one implementation, the aggregation provider 204 may act as an intermediary between the client device 200 and storage providers 110, as shown in FIG. 2A. Files may be transferred by the client to the aggregation provider 204, which may select and forward the files to storage providers 110. File retrieval may be performed similarly, with the client 200 requesting a file from the intermediary aggregation provider 204, which may retrieve the file from the corresponding third-party storage provider 110 and forward the file to the client device 200.

Figure 2B:
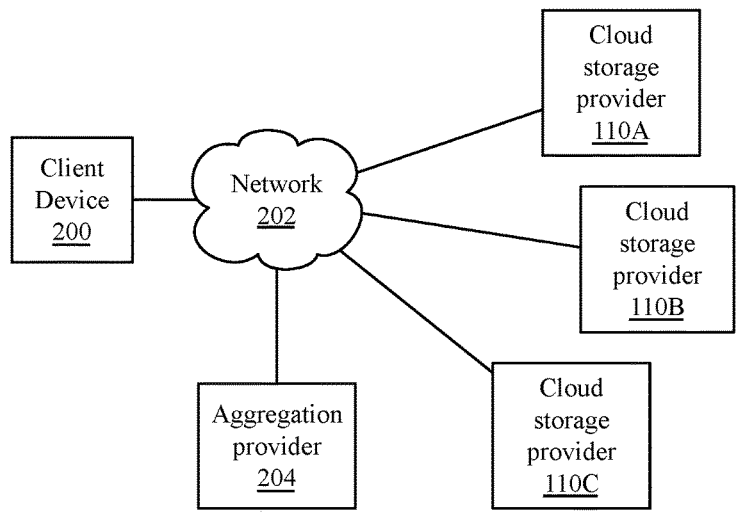
FIG. 2B is a block diagram of another computing environment for aggregation of a plurality of cloud storage services, according to another implementation.

In another implementation, the aggregation provider 204 may not be an intermediary for file transfers. For example, referring to FIG. 2B, illustrated is a block diagram of another computing environment for aggregation of a plurality of cloud storage services, according to another implementation. In such implementations, the aggregation provider 204 instead may merely provide instructions to client applications executing on client 200 to store or retrieve files from corresponding storage providers 110. In such implementations, file metadata may be stored at the aggregation provider 204, along with identifications of which third-party provider 110 is used for synchronization of each file.

Networks 202, 202' (referred to generally as network(s) 202) shown in FIGS. 2A and 2B may comprise any type and form of network or networks, including a Local Area Network (LAN), Wide Area Network (WAN) or the Internet. Networks 202 may comprise a variety of connections including, but not limited to, standard telephone lines, LAN or WAN links (e.g., Ethernet, T1, T3, 56 kb, X.25), broadband connections (e.g., ISDN, Frame Relay, ATM, etc.), wireless connections, (802.11a/b/g/n/ac, BlueTooth), cellular connections, satellite connections, or some combination of any or all of the above. A network 202 may comprise one or more intermediary devices, including switches, hubs, firewalls, gateways, access points, or other such devices. In some implementations, network 202 may be homogeneous, such as a plurality of wired links of the same type, while in other implementations, network 202 may be heterogeneous (e.g. a cellular link to a wired link to a satellite gateway to a wireless gateway, etc.)

Figure 3A:
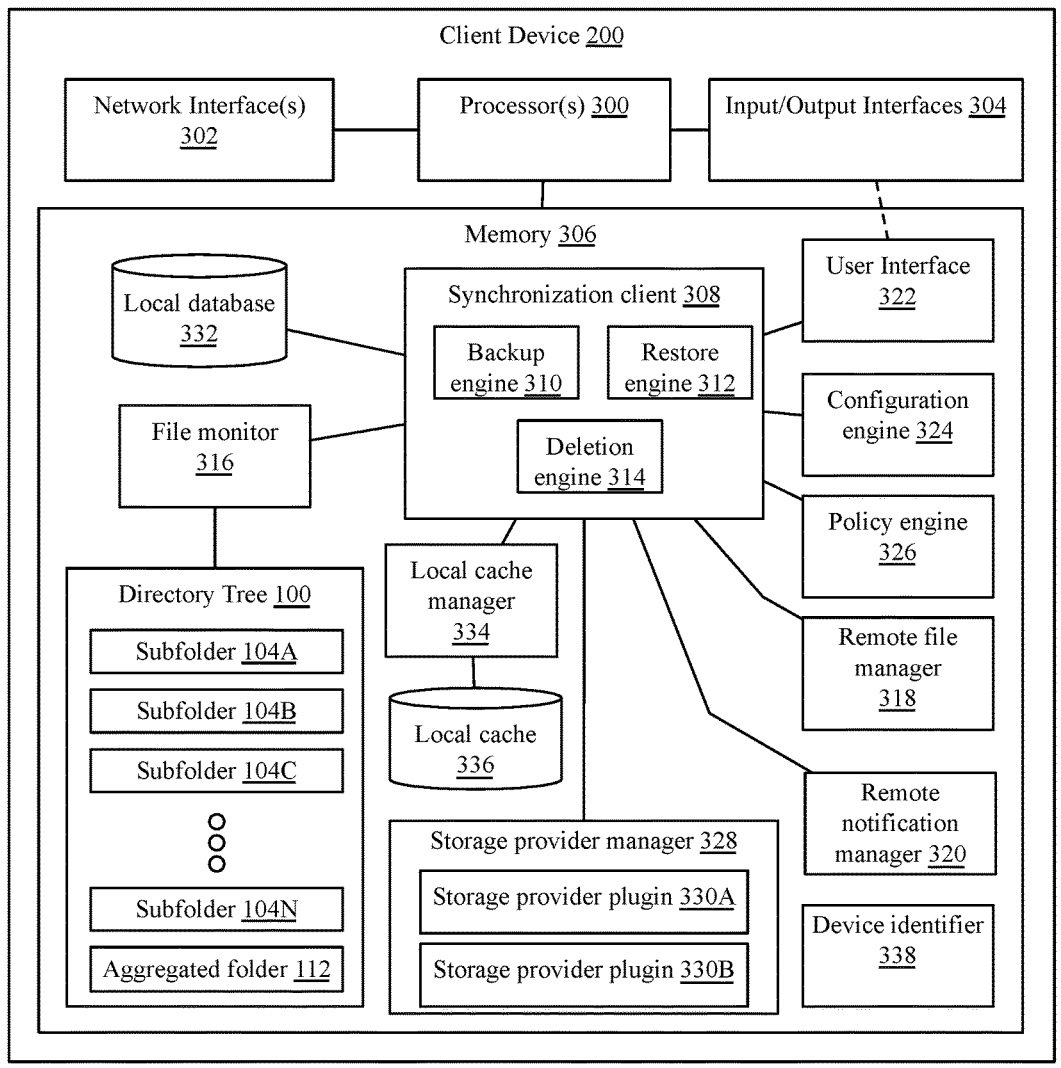
FIG. 3A is a block diagram of an implementation of a client computing device for aggregation of a plurality of cloud storage services.

FIG. 3A is a block diagram of an implementation of a client computing device 200 for aggregation of a plurality of cloud storage services. Client computing device 200 may comprise any type and form of computing device, including a laptop computer, desktop computer, rackmount computer, server, workstation, tablet computer, smart phone, wearable computer, or any other such device. In some implementations, client computing device 200 may comprise a virtual machine executed by a physical machine, e.g. via a hypervisor. In many implementations, client computing devices 200 may be referred to as client devices, user devices, backup or synchronization clients, or by any other similar term. Devices 200 may be of different types, brands, or models, and may execute different operating systems. A device 200 may comprise a processor 300, a network interface 302, memory 306 such as a hard drive, flash drive, or other sort of data storage, and input/output devices or interfaces 304 such as a display, keyboard, touch screen, or other such device. The processor 300 may execute a synchronization client 308, as well as an operating system, applications, or other processes or logic.

Processor 300 may comprise logic circuitry that responds to and processes instructions fetched from memory 306. The processor 300 may comprise a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors.

A network interface 302 may comprise a wired interface such as an Ethernet interface of any speed including 10BASET, 100BASET, Gigabit Ethernet, or any other such speed, a universal serial bus (USB) interface, a power line interface, a serial interface, or any other type of wired interface. In other implementations, network interface 302 may comprise a wireless interface, such as a Bluetooth, Wireless USB, 802.11 (WiFi) interface, or cellular interface, or any other type and form of wireless interface. In some implementations, a network interface 302 may include both a wired and wireless interface, to provide additional flexibility, reliability, or bandwidth. Network interface 302 may include one or more layers of a network stack, including transport layer functions, Internet layer functions, physical layer functions and interfaces, or any other such functions or interfaces. Network interface 302 may communicate via a network 202 and/or one or more other networks, including a local area network (LAN) behind a gateway or network address translator (NAT) or other such device. Accordingly, the network interface 202 may have an IP address that is available to a wide area network (WAN, such as the Internet) or may be behind an appliance and have an IP address directly available only to the local network. Network 202 may be a LAN, a WAN, a cellular network, a terrestrial or satellite network, or any combination of these or other networks. Network interface 302 may be used to establish a connection to an aggregation provider 204 and/or cloud storage providers 110.

Client device 200 may comprise one or more input or output interfaces 304, such as a keyboard, mouse, touchpad, touchscreen, microphone, camera, accelerometer, position tracker, joystick, or other such input devices; or a screen, audio speaker, video output, haptic output, or other such output device. Input and output interfaces 304 may be used to view and interact with a user interface 322, such as one provided by a synchronization client 308 or an operating system of the devices.

Client device 200 may include a memory storage device 306, such as a hard drive, flash drive, hybrid drive, or any other type and form of data storage including random access memory (RAM), dynamic RAM (DRAM), cache memory, or any other such form data storage. Memory 306 may store different types of data, including system files such as operating system executable files, libraries, a registry, user interface components, or other such data provided as part of or generated by an operating system of device 200. Memory 306 may also store one or more application files, such as executable applications, application specific libraries, templates, user interface components, settings or preferences files, application assets such as graphics or media, or any other type and form of application related files. Applications may include productivity or "office" applications, video games, web browsers including plug-ins or extensions, graphics or audio applications, or any other type and form of application. Although shown internal to client device 200, in many implementations, memory 306 may be internal, external, or a combination of internal and external, including external hard drives or flash drives, network drives, or other such storage devices.

Memory 306 may store a synchronization client 308. Synchronization client 308, sometimes referred to as an aggregation client or backup client, may comprise an application, service, server, daemon, routine, or other executable logic for aggregating cloud storage from a plurality of files and managing synchronization of files. Synchronization client 308 may comprise a backup engine 310, restore engine 312, and/or a deletion engine 314 for performing various file management and synchronization tasks, including backing up or transferring files to cloud storage or controlling file management to trigger a third party client application to transfer files to cloud storage; restoring files from cloud storage or controlling file management to trigger a third party client application to restore files to cloud storage; and for deleting files from cloud storage or controlling file management to trigger a third party client application to delete files to cloud storage.

Backup engine 310 may comprise an application, service, daemon, server, routine, or other executable logic for uploading files to storage providers 110 and notifying other components or services about success or failure of uploads. Backup engine 310 may utilize one or more communications protocols, including the file transfer protocol (FTP), hypertext transfer protocol (HTTP) or secure versions of these or other protocols, transport layer protocol (TCP) or user datagram protocol (UDP), or any other such communication protocols. Similarly, restore engine 312 may comprise an application, service, daemon, server, routine, or other executable logic for downloading files from storage providers 110. Delete engine 314 may comprise an application, service, daemon, server, routine, or other executable logic for triggering file deletion at storage providers 110, including transmitting requests for file deletion or retrieval without storage.

In some implementations, backup, restore, and deletion engines 310-314 may directly communicate with cloud storage services to control backup, retrieval, and deletion of files. In other implementations, as discussed above, the computing device 200 may execute proprietary synchronization clients for each cloud storage provider. In some implementations, these clients may be modified to monitor, read from, and write to an aggregated folder 112, while in other implementations, these clients may read and write files to and from monitored subfolders 104, which may be hidden from a user-accessible interface or directory structure. Aggregation may be performed without modifying the proprietary synchronization clients in such implementations.

Synchronization client 308 may execute or communicate with a file monitor 316. File monitor 316 may comprise an application, service, daemon, server, routine, or other executable logic for scanning an aggregated folder 112 and/or monitored subfolders 104A-104N associated with cloud storage services for missing, new, or modified files. In many implementations, a file monitor 316 may hook or intercept operating system calls to a file system or storage system to monitor file writes. In other implementations, an operating system may provide explicit callbacks or indications of new or modified files. For example, in one implementation, a user may create a file in an aggregated folder 112 on the client device 200. File monitor 316 may identify the new file, either by monitoring a file write, receiving a callback from the operating system, or periodically scanning the folder contents and comparing to a previous state. File monitor 316 may notify a synchronization client 308 of the new file for selection of a cloud storage service and transfer of the file. In another implementation, a user may create a file on a different device that is synchronized to a cloud storage provider. The cloud storage provider may push the new file to the client device 200 or, periodically, a client application may request new files from the storage provider and write the newly received file(s) to a monitored subfolder 104. File monitor 316 may monitor the monitored subfolder 104 and identify the new file, and may direct the synchronization client to move the file to an aggregated folder 112 and/or generate symlinks as discussed above, etc. In some implementations, file monitor 316 may also identify whether free space in memory 306 or in accounts associated with the client device at cloud storage providers are below a threshold or approaching zero, and may direct the synchronization client 308 to move files between monitored subfolders 104 as necessary to load balance or free up space.

Memory 306 may include a remote file manager 318. Remote file manager 318 may comprise an application, service, daemon, server, routine, or other executable logic for transferring file metadata to and from an aggregation provider 204. File metadata may include any type and form of information about a file, including a title, directory path, size, creation and/or modification date, type, whether the file is compressed and/or encrypted, whether the file is marked for high availability or security, or any other type and form of information. File metadata may include ID3 tags, file headers, or other such data.

Memory 306 may comprise a remote notification manager 320. Remote notification manager 320 may comprise an application, service, daemon, server, routine, or other executable logic for communicating with an aggregation provider 204 to identify files, cloud storage providers and accounts, and interface between the aggregation provider 204 and the synchronization client 308.

Memory 306 may comprise a user interface 322 for interacting with synchronization client 308. In some implementations, as discussed above, an operating system may not provide the user with direct access to file management or a directory structure. In such implementations, a synchronization client 308 may provide a user interface 322 to allow the user to see and interact with synchronized files, aggregated from the cloud storage providers. In other implementations, such as where an operating system does provide the user with access to a file manager, user interface 322 may comprise indicators or identifiers of synchronization status of files, such as overlay icons.

Memory 306 may comprise a configuration engine 324. Configuration engine 324 may comprise an application, service, daemon, server, routine, or other executable logic for configuring synchronization client 308, file monitor 316, remote file manager 318, and/or a policy engine 326. In some implementations, configuration engine 324 may be modified via a user interface 322, while in other implementations, an aggregation provider 204 or synchronization client 308 may transmit configuration comments to configuration engine 324.

Memory 306 may comprise a policy engine 326. Policy engine 326 may comprise an application, service, daemon, server, routine, or other executable logic for deciding what and how to back up or synchronize and where, and what and how to delete files and when. Policy engine 326 may comprise a set of one or more rules or filters for matching file types, sizes, recent use or modification times, or other such information, and may have corresponding actions (e.g. if file type is "photo", add for pipeline processing via first cloud storage service, and store at second cloud storage service, etc.).

Memory 306 may comprise a storage provider manager 328. Storage provider manager 328 may comprise an application, service, daemon, server, routine, or other executable logic for managing third party cloud storage providers or services and/or user or device accounts at these providers. In some implementations, storage provider manager 328 may comprise a set of application programming interfaces (APIs) or command definitions for interacting or communicating with third party storage providers. APIs or commands may be stored in one or more plugins, such as storage provider plugins 330A-330B, and loaded or unloaded as necessary depending on what accounts or providers are utilized by the synchronization client 308. In some implementations, storage provider manager 328 and plugins 330 may be utilized instead of third party client synchronization applications to synchronize files with corresponding third party cloud storage providers. In other implementations, storage provider manager 328 and plugins 330 may be used to trigger actions by third party client synchronization applications, such as retrieving files from storage. Accordingly, storage provider manager 328 and plugins 330 may translate commands of a synchronization client 308 into proprietary APIs for third party services or applications.

Memory 306 may comprise a local database 332. Database 332 may comprise a data file, flat file, data array, relational database, or any other type and form of data storage. Database 332 may store information about files, such as file metadata, and/or information about user accounts and/or cloud storage providers. In some implementations, a synchronization client may calculate cryptographic hashes of files for synchronization. The hash of the file may be transmitted to cloud storage providers or an aggregation provider to identify whether the file needs to be transmitted for synchronization (e.g. whether the hash matches or does not match a hash of a file stored at the cloud storage provider). Hash algorithms may be any suitable algorithm for representing data in a small format, such as the MD5 algorithm, SHA-256 algorithm, or any other such algorithm, and may be stored in a local database 332. Hashes may be used for comparison and synchronization activities without providing identifying metadata to an aggregation provider or cloud storage service, and allowing files to be encrypted by the client device 200 before transfer. Local database 332 may also identify file fragments, in implementations in which files are fragmented before synchronization, and locations of storage of files and/or fragments at one or more storage providers.

Memory 306 may also include a local cache manager 334, and a local cache 336 maintained by the cache manager. Local cache manager 334 may comprise an application, service, daemon, server, routine, or other executable logic for managing a cache 336 of file metadata, image thumbnails, previous versions of synchronized files, or any other such data. The cache may be used to provide faster access to synchronized files or for showing thumbnails of media files in a user interface.

Memory 306 may also store a device identifier 338, which may comprise a numeric string, alphanumeric string, media access control (MAC) address, serial number, user or account name, or any other type and form of identifier for identifying a client device 200. Device identifier 338 may be provided by a synchronization client 308 or storage provider manager 328 to a server, aggregation provider, or cloud storage provider, along with file hashes and/or files, and may be recorded or associated with the hashes or backed up files. During file restoration or synchronization, the synchronization client 308 or storage provider manager 328 may provide the device identifier 338, and in some implementations, file hashes or identifiers, and the backup server may identify associated file hashes and restore corresponding files to the device 200. Accordingly, files may be retrieved without providing file names, directories, metadata, or other identifiable information to the backup server, increasing security and privacy.

Although shown separate from synchronization client 308, in many implementations, one or more of components 316-338 may be part of the synchronization client 308, such as sub-routines, services, or daemons executed by the client 308. In many implementations, synchronization client 308 may be responsible for managing communications between components 316-338.

Figure 3B:
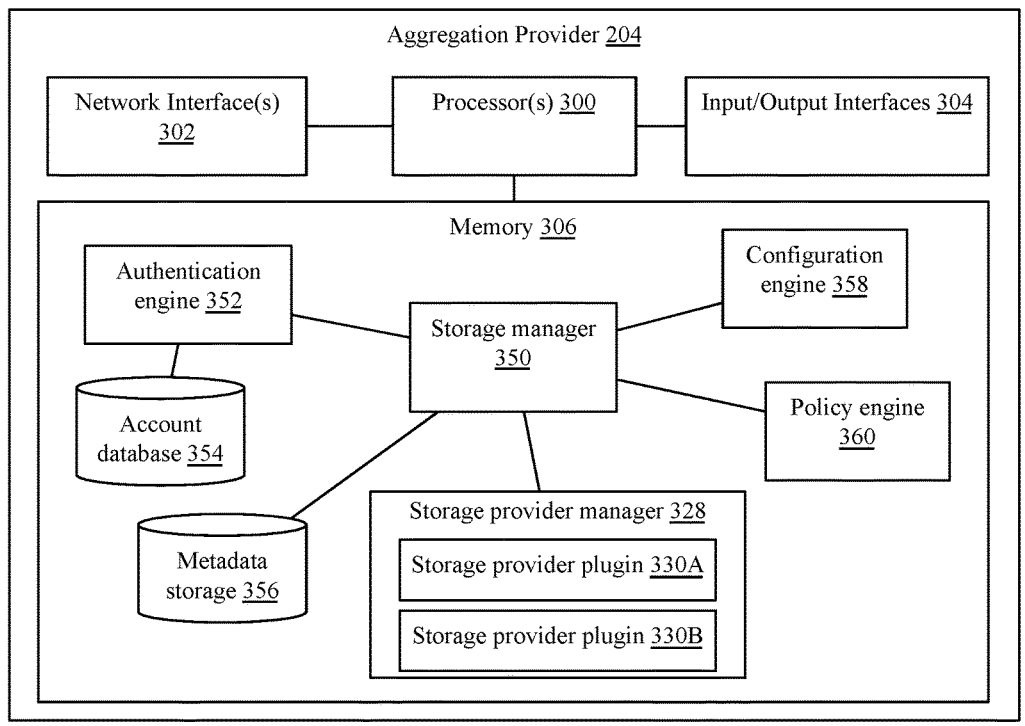
FIG. 3B is a block diagram of an implementation of a computing device of an aggregation provider.

FIG. 3B is a block diagram of an implementation of a computing device of an aggregation provider 204, referred to generally as an aggregation provider 204 or aggregation provider device 204. Aggregation provider 204 may comprise one or more computing devices, including rackmount servers, desktop servers, workstations, virtual machines executed by one or more physical machines, a server cluster, cloud, or farm, or other such devices. As with a client computing device 200, aggregation provider 204 may comprise one or more processors 300, network interfaces 302, input/output interfaces 304, and/or memory 306. In many implementations, aggregation provider 204 may be a headless computer, not including input or output devices 304. Similarly, in many implementations, memory 306 may be divided across one or more storage servers, which may be part of or separate from aggregation provider 204.

Memory 306 of an aggregation provider 204 may comprise a storage manager 350, authentication engine 352 and account database 354, metadata storage 356, a configuration engine 358, a policy engine 360, and/or a storage provider manager 328 storing one or more storage provider plugins 330. For example, in implementations in which aggregation provider 204 serves as an intermediary between a client device 200 and third party cloud storage services 110, aggregation provider may execute a storage provider manager 328 to communicate with proprietary APIs of each cloud storage provider, as discussed above.

Storage manager 350 may comprise an application, service, daemon, server, routine, or other executable logic for managing aggregation and distribution of client files to cloud storage providers. Storage manager 350 may receive requests to synchronize or store a file in the aggregated cloud from a client device, in some implementations, and may select one or more cloud storage providers to which the file or file fragments should be directed for storage. Storage manager 350 may apply one or more policies in selecting storage providers, based on relative storage amounts at different providers, file types, and/or advanced processing available from different providers.

An authentication engine 352 may comprise an application, service, daemon, server, routine, or other executable logic for identifying and authenticating client devices and/or users of said devices. Authentication engine 352 may maintain or communicate with an account database 354 to identify client devices and associated accounts at one or more cloud storage providers. Client devices may authenticate themselves to authentication engine 352 via account names, user names, passwords, device identifiers, device characteristics (e.g. IP or MAC addresses, machine types, operating systems, software versions, etc.), or any other such processes. In some implementations, a client device and authentication engine 352 may exchange public cryptographic keys, cookies, session identifiers, or other entities to aid identification and authentication.

Account database 354 may comprise a data file, flat file, array, index, table, or any other type and format of database for identifying devices, users, accounts including accounts at third party storage providers, or other such information. Database 354 may be used by an authentication engine 352 to identify and authenticate devices or accounts.

Storage manager 350 may store file metadata in metadata storage 356, which may comprise a data file, flat file, array, index, table, or other type and format of database. Metadata storage 356 may store information about synchronized files, including metadata of each file (e.g. file names, sizes, modification or creation dates, types, ID3 tags, thumbnails, or other such identifiers); fragmentation of the file, if any (e.g. number, size, order, and/or identifiers of fragments); and locations where the file and/or fragments are stored (e.g. which cloud provider and under which identifier, URI, URL, or other address). In some implementations, metadata storage 356 may store identifications of compression and/or encryption types for a file.

Configuration engine 358 may comprise an application, service, daemon, server, routine, or other executable logic for configuring provider selection and storage policies for storage manager 350. Configuration engine 358 may be accessed via a user interface provided by the device, such as a GUI, or may be accessed via a network interface. Configuration engine 358 may allow an administrator to set rules, thresholds, load balancing parameters, or other such information.

Policy engine 360 may comprise an application, service, daemon, server, routine, or other executable logic for applying storage policies during selection of storage providers. Policy engine 360 may execute one or more rules established by a configuration engine 358 to select one or more storage providers at which to store a file. Policy engine 360 may perform service provider selections based on any type and form of rules, thresholds, parameters, or other data.

Although shown separate, in many implementations, components 352-360 may be part of storage manager 350. In other implementations, one or more of components 352-360 may be separate, and may be executed by a separate computing device.

Figure 3C:
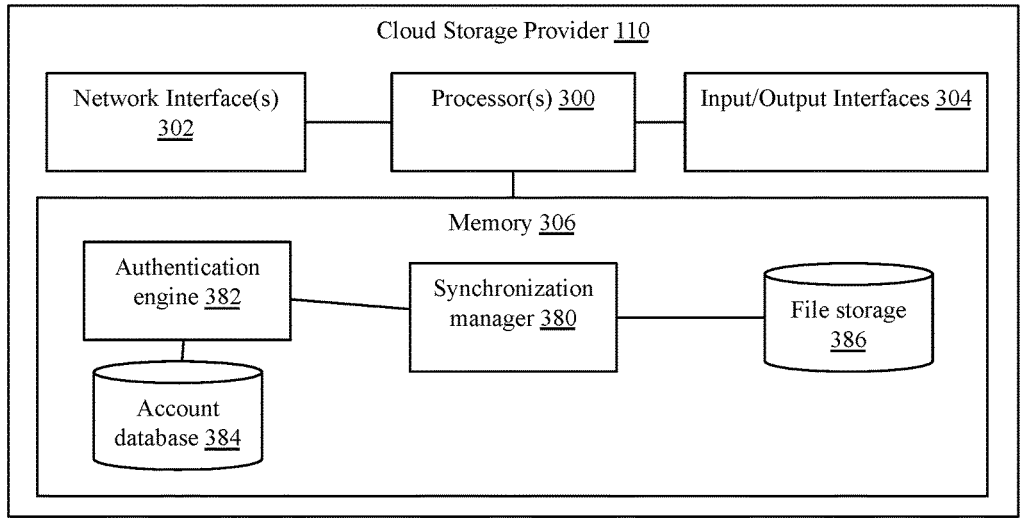
FIG. 3C is a block diagram of an implementation of a computing device of a cloud storage provider.

FIG. 3C is a block diagram of an implementation of a computing device of a cloud storage provider 110. As with aggregation providers 204, a cloud storage provider 110 may comprise one or more desktop or rackmount servers, physical computing devices, virtual computing devices executed by one or more physical computing devices, clusters, farms, or clouds of real or virtual machines, or other such devices. Similarly, cloud storage providers 110 may comprise a plurality of computing devices, such as storage devices and processing or management devices, and may be distributed over a wide area in many implementations. A cloud storage provider 110 may comprise one or more processors 300, network interfaces 302, input/output interfaces 304, and memory devices 306.

In many implementations, a cloud storage provider 110 may execute a synchronization manager 380 for communicating with synchronization or backup client applications on a plurality of client devices, and for sending and receiving files to and from the client devices. As discussed above, different cloud storage providers 110 may use different synchronization managers 380, with different communications standards or APIs.

A cloud storage provider 110 may execute an authentication engine 382, which may be similar to authentication engine 352 and perform many of the same functions. Similarly, authentication engine 382 may communicate with or maintain an account database 384.

A cloud storage provider 110 may also maintain file storage 386, which may comprise one or more physical and/or virtual storage devices, across one or more physical computing devices. A user account may be allotted a storage quota or maximum storage amount allowed for use from file storage 386.

Aggregation of Accounts with Cloud Storage Services or Providers

Figure 4A:
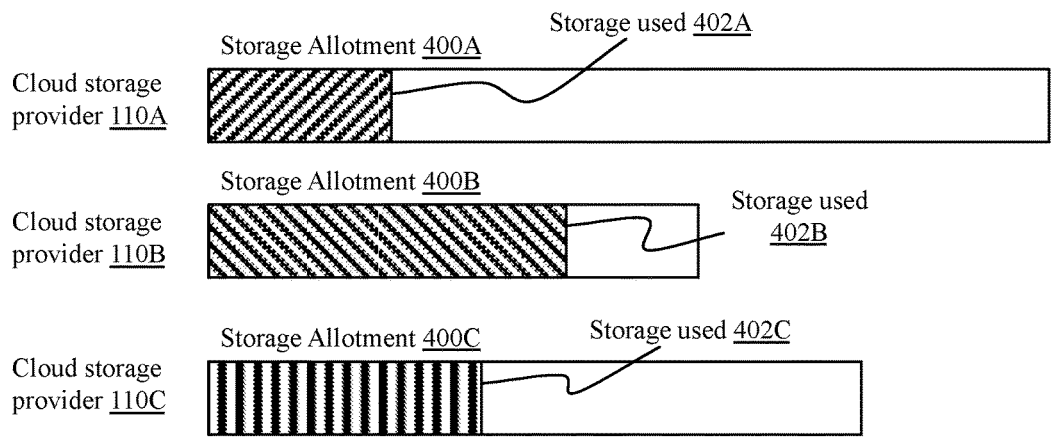
FIGS. 4A-4F are graphs illustrating different implementations of cloud storage aggregation and management policies.

As discussed above, in many implementations, users may have multiple storage accounts with different storage providers, each of which may have different storage allotments or policies. Referring first to FIG. 4A, illustrated is a first graph of implementations of cloud storage utilization across a plurality of different cloud storage providers 110A-110C. As shown, each provider 110A may provide a different storage allotment 400A-400C, referred to generally as a storage quota or storage allotment 400. As a user manually adds files and folders to monitored folders or generates files for synchronization, different amounts of storage may be used at each provider, as shown in bars 402A-402C. As shown, the storage distribution may be unbalanced, potentially resulting in out of room notifications from one provider (e.g. provider 110B) even though plenty of space remains at a different provider.

Figure 4B:
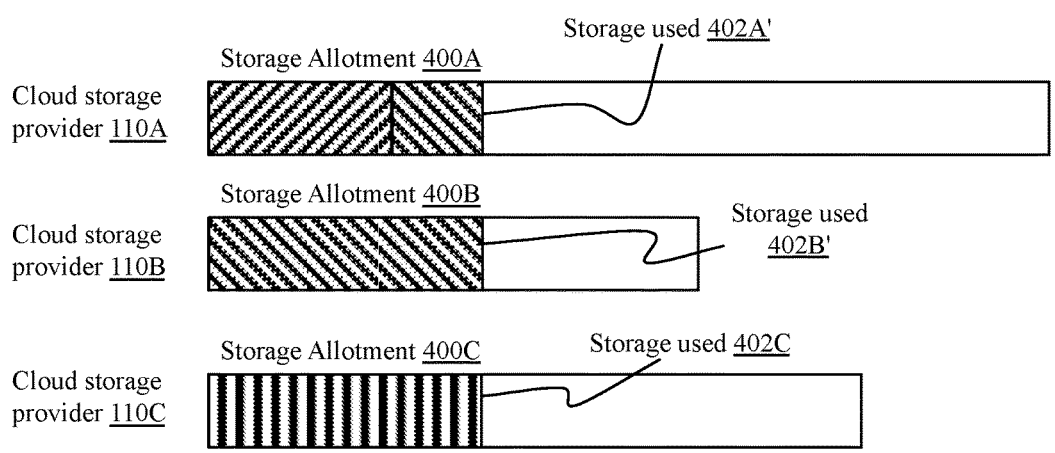

Referring now to FIG. 4B, in one implementation of an aggregation policy, storage utilization may be balanced between different providers 110A-110C by amount. As new files are generated or modified, a storage manager or synchronization client may select a target cloud storage provider 110 to store the file based on current utilization at each provider. A provider with the lowest storage used 402A-402C may be selected to receive the file. In some implementations, particularly when a large file is synchronized to cloud storage resulting in a large imbalance between providers, the storage manager or synchronization client may select other files (e.g. smaller files, for example) at the same provider to be removed and transferred to other providers to rebalance the storage utilization. In implementations in which a storage manager or aggregation provider is an intermediary between clients and storage providers, the aggregation provider may transmit requests to download such files from one storage provider and upload them to another provider directly. In other implementations in which all communications with the providers are performed by client devices, the aggregation provider may transmit commands or instructions to the client device to transfer files from one monitored folder to another, causing third party synchronization applications to initiate synchronization to one provider and deletion from another provider.

Figure 4C:
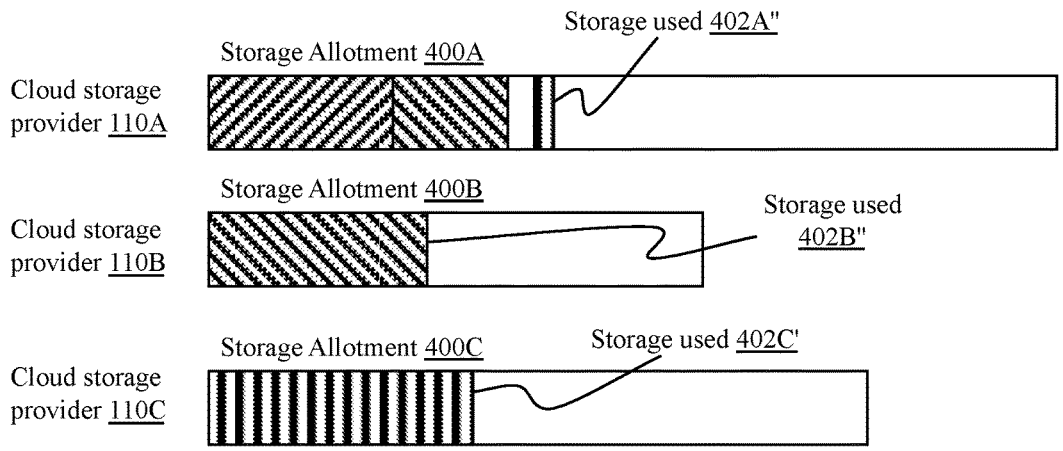

In a similar implementation shown in FIG. 4C, storage utilization may be balanced by percentage rather than size. This may be particularly useful where storage allotments 400A-400C are very different, to prevent prematurely overloading accounts with smaller allotments.

Figure 4D:
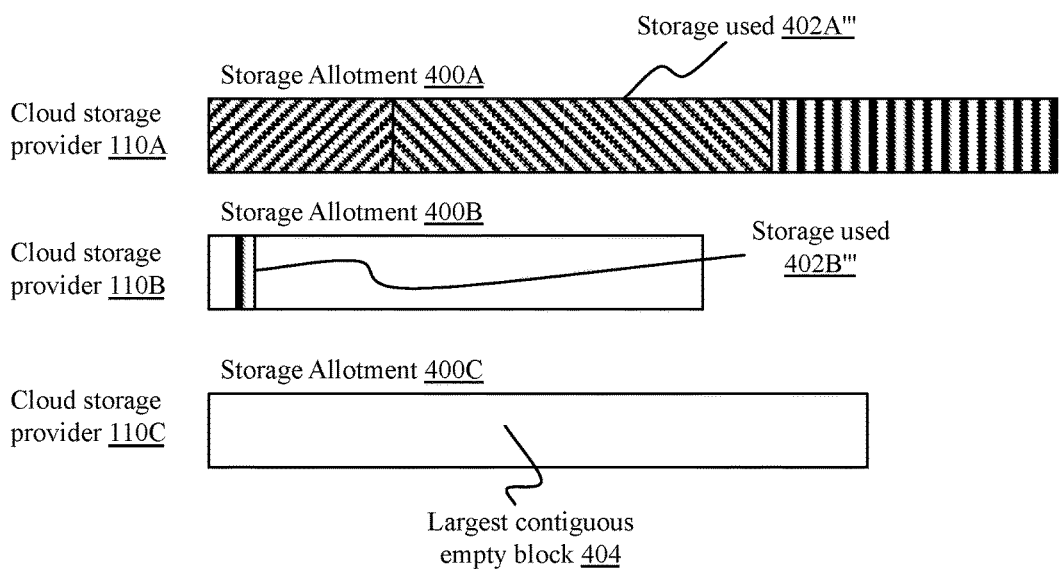

In another implementation illustrated in FIG. 4D, a synchronization client or aggregation provider may distribute files to ensure a largest contiguous empty block 404 exists at a single storage provider 110 within the aggregated storage. For example, some users may generate very large files, such as when recording high resolution video. Rather than load balancing accounts so that each of three accounts has 1 GB free, for example, it may be preferable to transfer files so that one account has 3 GB free. In one such implementation, an aggregation provider or synchronization client may select to transfer new files to a cloud storage provider having a least amount of free space that is large enough to store the file. Accordingly, in such implementations, the storage allotment at one provider will be filled first before moving to the next provider, leaving a largest contiguous block free. In some implementations, as files are deleted from storage, other files may be transferred between providers to maintain the largest contiguous empty block 404 as necessary.

Figure 4E:
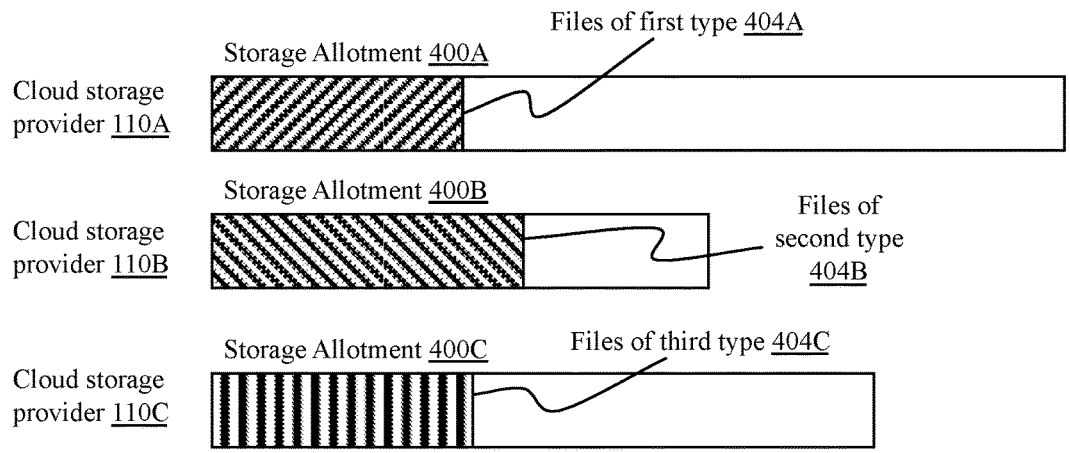

In another implementation illustrated in FIG. 4E, files of different types 404A-404C may be distributed to different cloud storage providers 110A-110C. This may be done responsive to storage policies associated with the provider, such as a provider that provides unlimited storage for photos (e.g. storage of photos may not count against a storage allotment 400 at the provider). In such cases, storage may be maximized by directing all files of the corresponding type to the storage provider.

In a similar implementation, different storage providers may provide enhanced processing for certain types of files. For example, some cloud storage providers may identify music files synchronized for storage and replace the files with higher bitrate versions of the same songs. Similarly, some cloud storage providers may perform facial recognition or geotagging on uploaded photos. Files of the corresponding type may be directed to the cloud storage provider to take advantage of the enhanced processing.

Figure 4F:
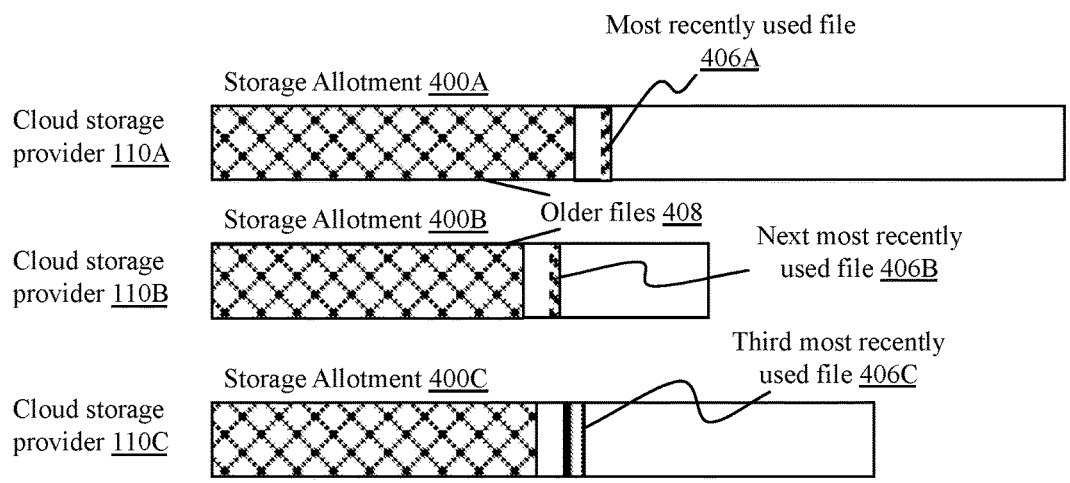

In another implementation illustrated in FIG. 4F, recently used files 406A-406C may be distributed across a plurality of storage providers in a round robin fashion, to increase access speed. For example, should files on a client device be deleted or corrupted, a user may retrieve copies of the files at the cloud storage providers to recover their work. The most recently generated or modified files may be most relevant to the user, representing recent work, recently sent or received emails, most recently taken pictures, etc. By distributing these files among the storage providers, they can be requested in parallel, utilizing upload bandwidth of each provider and minimizing the time it takes to recover these files.

In some implementations, files may be distributed to multiple cloud storage providers for high availability, in case any one provider fails or is offline. The synchronization client or aggregation provider may count such files only once in determining an overall amount of storage utilized, indicating to the client that they may store additional files, albeit at the loss of some reliability. For example, given three providers and one 100 MB file, the synchronization client may direct the file to be backed up at each provider, utilizing 300 MB of space. However, the client may report only 100 MB of utilized storage to the user, indicating that additional files may be stored in the same space. If the user subsequently generates additional files that would exceed the storage allotment, one or both additional copies of the 100 MB file may be deleted from storage at the cloud provider, freeing room for the additional files. In this way, the system may provide additional reliability, when space is available, transparently to the user. In a similar implementation, rather than backing up the entire file, error correction data may be backed up at additional cloud providers, allowing recovery of a file and utilizing less storage space, albeit at the expense of more processing time.

In a further implementation, during synchronization of a file back to the client device, fragments or segments of the file that have been backed up at multiple providers may be requested from the providers in parallel. For example, the synchronization client may request a first fragment from a first provider, a second fragment from a second provider, and a third fragment from a third provider, potentially utilizing more upload bandwidth from the providers and reducing the time to receive the entire file.

Figure 5A:
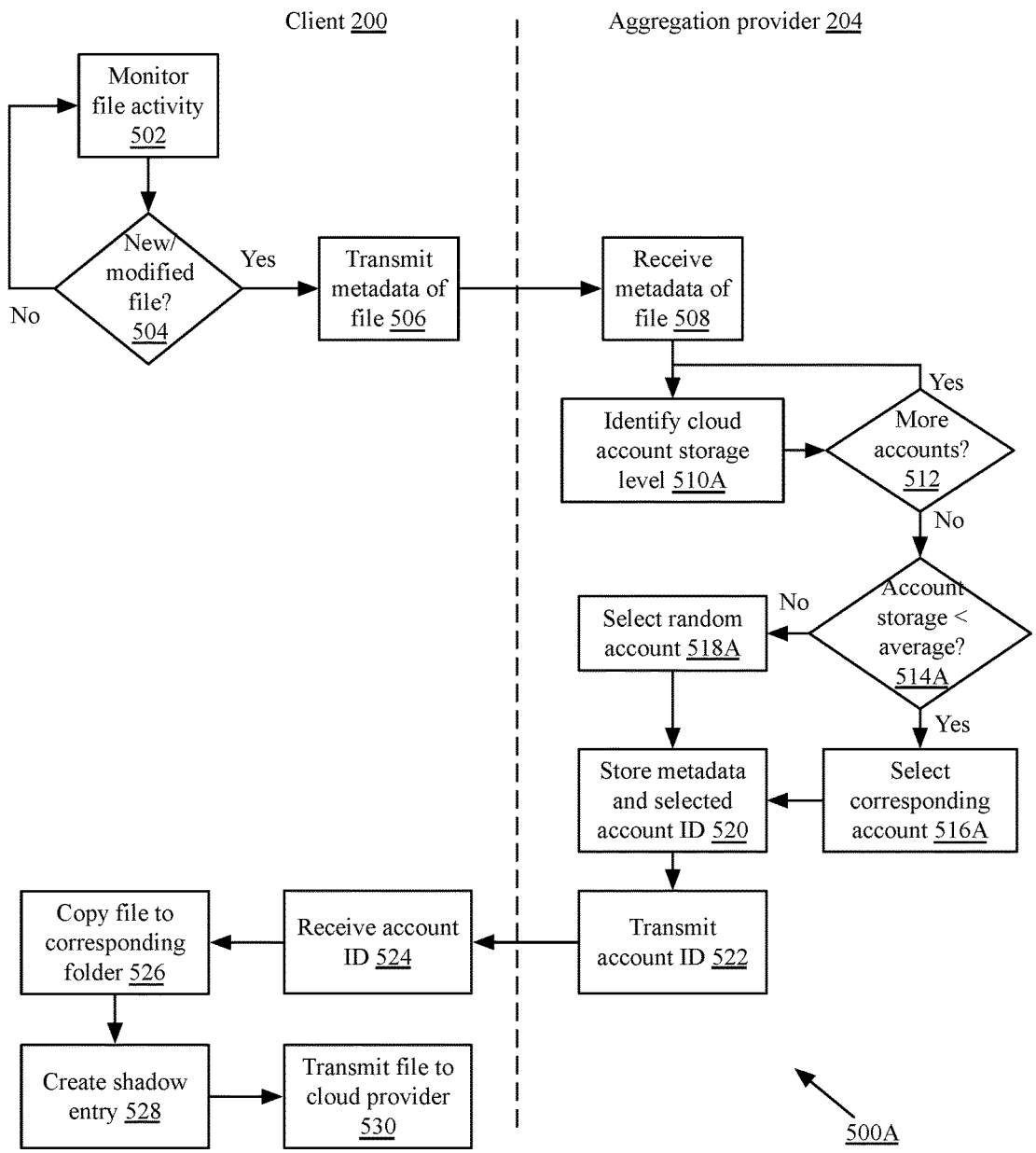
FIGS. 5A-5F are flow charts of different implementations of methods for cloud storage aggregation and management.

FIG. 5A is a flow chart of an implementation of a method 500A for cloud storage aggregation and management. Although shown with steps distributed between a client device 200 and aggregation provider 204, in some implementations, one or more steps may be performed by the other device. For example, calculation of storage utilization at steps 510A-512, discussed in more detail below, may be performed by the client device and, in some implementations, the result may be transmitted to the aggregation provider at step 506. Similarly, account selection at steps 514-520 may be performed in some implementations by the synchronization client on the client device, in some implementations.

Still referring to FIG. 5A and in more detail, at step 502, in some implementations, a client device or a file monitor executed by the client device may monitor file activity. As discussed above, the file monitor may periodically scan the contents of a folder for changes from a previous time period, or may monitor or hook file read or write commands from an operating system. In some implementations, the file monitor may monitor designated folders (e.g. those corresponding to cloud storage providers, such as monitored folders; or those corresponding to certain applications or file types, such as a pictures folder). In other implementations, the file monitor may monitor all file read and write activity by the operating system or applications. At step 504, if there no new or modified files, the file monitor may repeat steps 502-504 periodically or continuously.

At step 506, in some implementations, responsive to identifying a new or modified file for synchronization, a synchronization client on the client 200 may transmit metadata of the file to an aggregation provider 204. In some implementations, the transmitted metadata may comprise an identification of a file type and size, but may not include additional information about the file, to protect privacy of the user. In other implementations, such as where a file may be transmitted to a cloud storage provider for additional processing, the transmitted metadata may include additional information. Transmission of the metadata to the aggregation provider may also include transmission of a device identifier, user identifier, account identifier, or other such data, and may include a handshaking or authentication procedure.

At step 508, in some implementations, the aggregation provider may receive the metadata. At step 510A, the aggregation provider may identify a storage level of an account associated with the device or user at a first cloud storage provider. In some implementations, the aggregation provider may transmit a request to the cloud storage provider for an identification of storage utilization, the request comprising an account identifier associated with the client device. In other implementations, the aggregation provider and/or the synchronization client may identify the storage utilization based on a total of synchronized files (minus any exempted files, such as those for which the cloud storage provider provides unlimited storage). The storage utilization and/or size of synchronized files may be stored in a database at the client and/or aggregation provider. At step 512, the aggregation provider 204 may determine if additional accounts exist for the client device. If so, steps 510A-512 may be repeated iteratively for each account.

At step 514A, the synchronization client or aggregation provider may determine if an account at a cloud storage provider has a storage utilization that is less than an average storage utilization of accounts associated with the device among the cloud storage providers. If so, at step 516A, the synchronization client or aggregation provider may select the corresponding account. In some implementations, if multiple accounts have storage utilizations less than the average, the synchronization client or aggregation provider may select the account with the least storage utilization. In other implementations, the synchronization client or aggregation provider may select randomly from the multiple accounts. In another implementation, step 514A may be skipped, and the account having the lowest storage utilization may be selected at step 516A. If all of the accounts have utilizations at the average or are balanced, then at step 518A, the synchronization client or aggregation provider may select an account randomly.

At step 520, in some implementations, the synchronization client or aggregation provider may store metadata of the file and an identifier of the account associated with the client device at the selected storage provider in a local database. The identifier may include an identification of the storage provider, an IP address or URL of the storage provider, an address of the file for storage, or any other such information.

At step 522, in some implementations, the aggregation provider may transmit the identifier of the account associated with the client device at the selected storage provider to the client device. The transmission may be as a response to a request of the client transmitted at step 506, or may be communicated without an explicit request-response format. At step 524, in some implementations, the client device may receive the account identifier.

In some implementations in which provider applications monitor designated folders, at step 526, the file may be copied to the folder corresponding to the selected cloud storage provider. At step 528, in some implementations, the synchronization client may create a shadow entry in an aggregated folder, such as a shortcut or symlink to the original file; may create a symlink in a monitored folder to the file in an aggregated folder; or may add an entry to a database or table identifying the file for presentation in a user interface. At step 530, the file may be transmitted to the selected cloud storage provider.

Figure 5B:
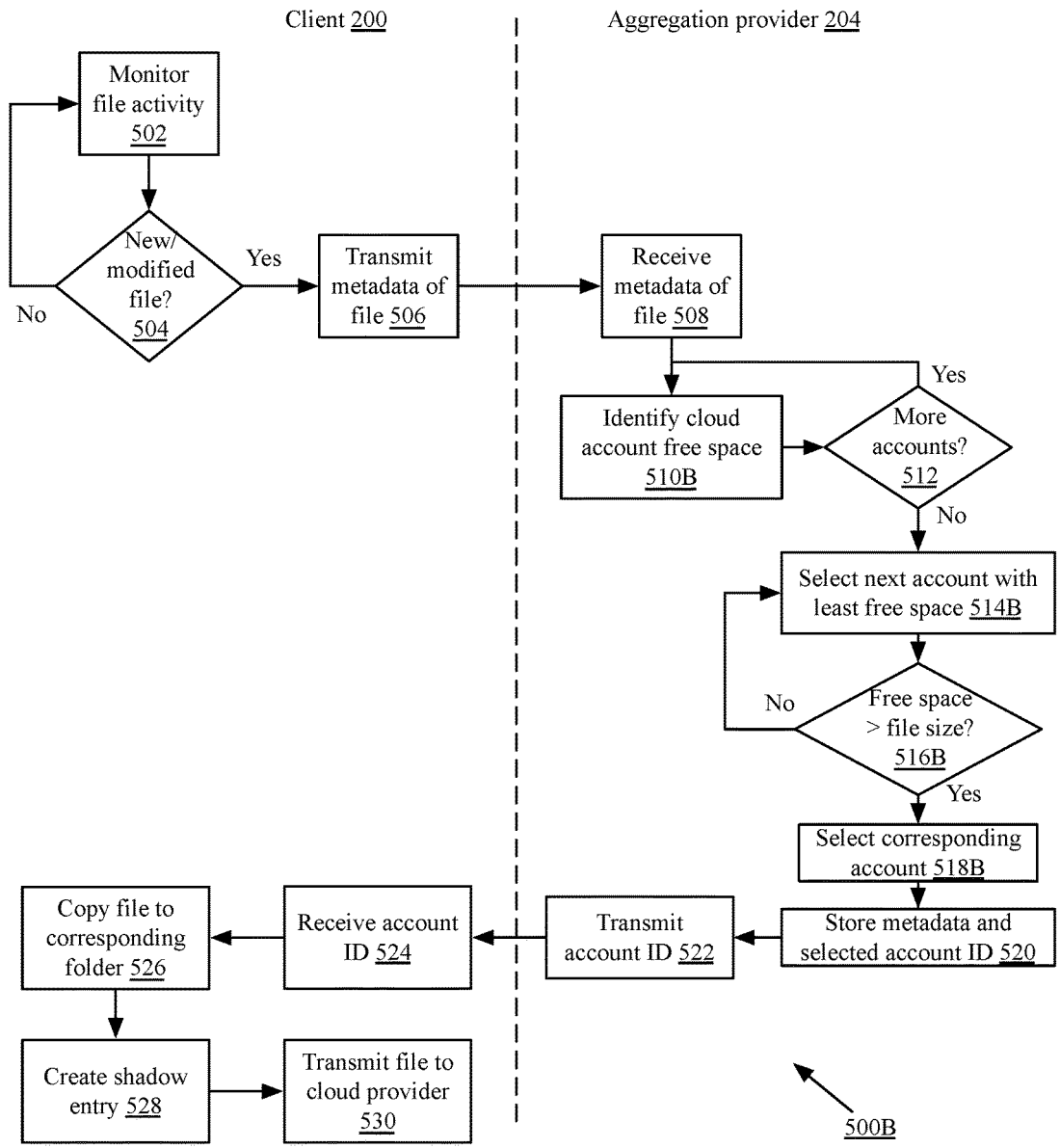

FIG. 5B is a flow chart of another implementation of a method 500B for cloud storage aggregation and management, with file distribution policies configured maintain a largest amount of contiguous free space. Method 500B is similar to method 500A at many steps. However, in implementations of method 500B, at step 510B, the aggregation provider or synchronization client may identify an amount of free space remaining for each account associated with the device at a cloud storage provider. At step 514B, the aggregation provider or synchronization client may select an account with the least free space remaining. At step 516B, the aggregation provider or synchronization client may determine whether the amount of free space is larger than the size of the file to be synchronized. If not, then steps 514B-516B may be repeated for each next account, in order of free space from least to most. Once an account is identified that has a free space that exceeds the file size to be synchronized, the account may be selected at step 518B. Metadata of the file and the account ID may be stored at step 520, and the method may proceed as in method 500A. Accordingly, in implementations utilizing method 500B, the aggregation provider or synchronization client may distribute files to accounts having the least space available, ensuring that an account with a largest contiguous block of free space is only used for files that are too large to be stored elsewhere.

Figure 5C:
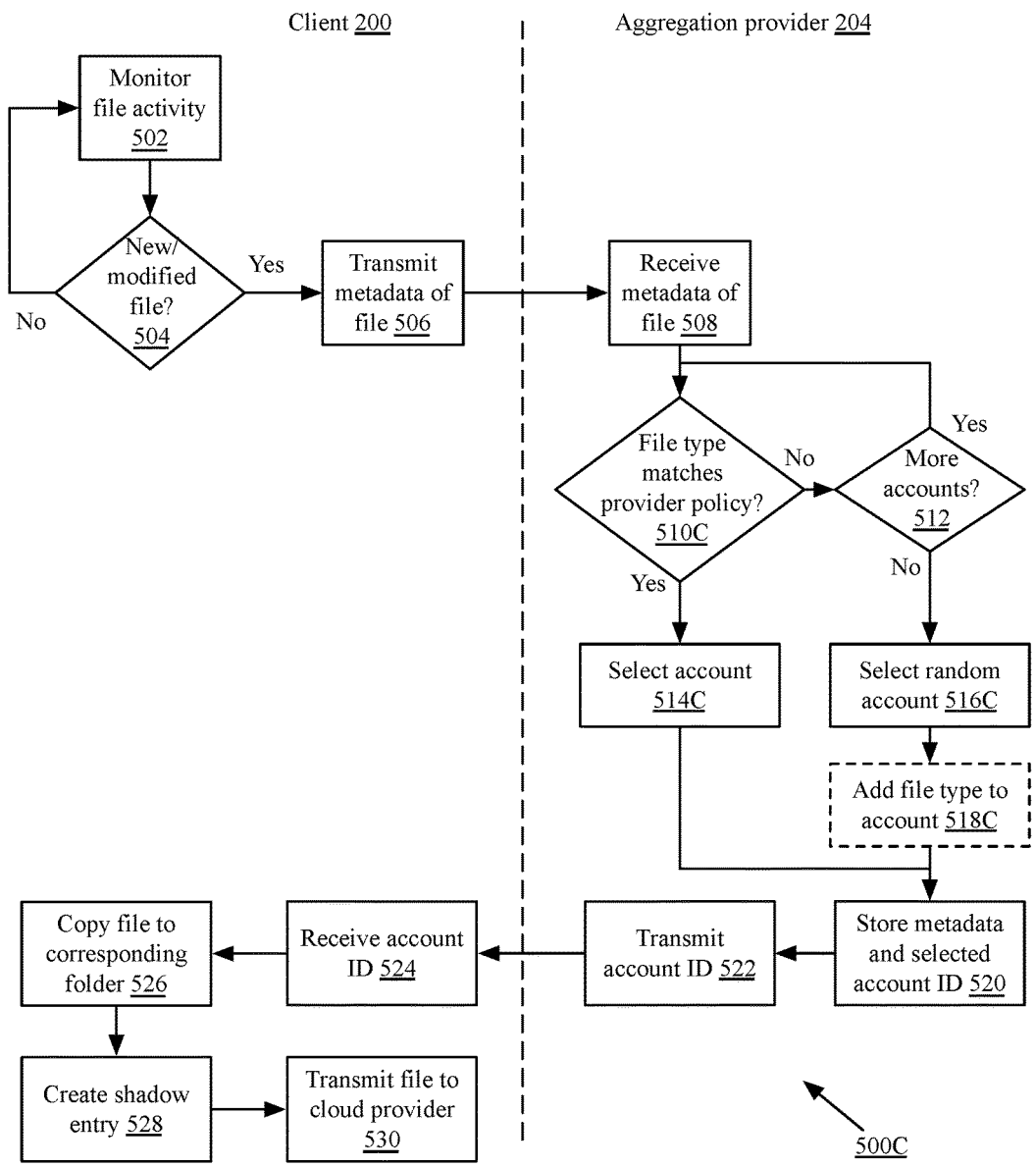

FIG. 5C is another flow chart of an implementation of a method 500C for cloud storage aggregation and management, similar to methods 500A and 500B, with file distribution based on file type. At step 510C, the aggregation provider or synchronization client may determine whether a type of file identified in metadata of the file received at step 508 matches a policy for an account or storage provider. As discussed above, such policies may include unlimited storage for a type of file, such as photos, or automatic replacement of music files with higher bitrate versions. If the type of file matches a policy for the provider, then at step 514C, a corresponding account associated with the device or user at the cloud storage provider may be selected. If not, steps 512 and 510C may be repeated for additional storage providers having accounts associated with the device. If no account matches, then at step 516C, in some implementations, an account may be selected randomly to store the file from the set of possible accounts associated with the device. In some further implementations, the file type of the file may be stored as associated with the account. This may be done so that future files of the same type are distributed to the same storage provider, so that such files are stored together.

In other implementations, step 518C may be skipped. Similarly, in some implementations, other policies may be applied to select an account at 516C. For example, in some implementations, policies from methods 500A or 500B may be applied at step 516C if the file type of the file does not match any storage provider policy. Method 500C may conclude with steps 520-530, similar to those discussed above in connection with method 500A.

Figure 5D:
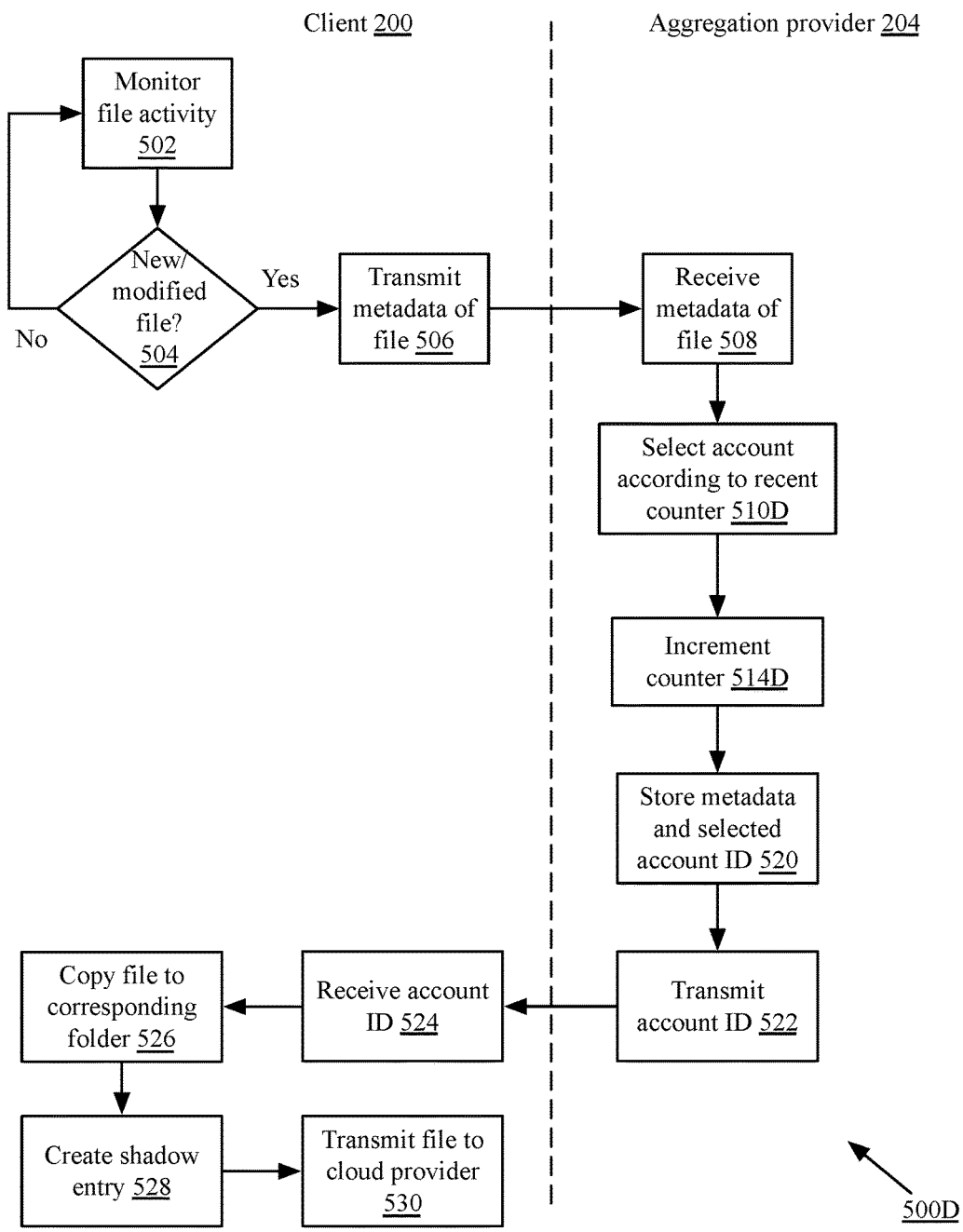

FIG. 5D is a flow chart of another implementation of a method 500D for cloud storage aggregation and management, similar to methods 500A-500C, with a round robin file distribution. At step 510D, in some implementations, an account of a plurality of accounts associated with the device at a corresponding plurality of storage providers may be selected by the aggregation provider or synchronization client to store a file for synchronization or backup. Identifications of the accounts may be stored in an index, table, or array, and a pointer or counter associated with the index may be maintained to indicate which account should be selected. After selecting the account, the pointer may be advanced or counter may be incremented at step 514D, such that on a subsequent iteration of method 500D, the next account may be selected. The method may continue with steps 520-530, as discussed above.

Figure 5E:
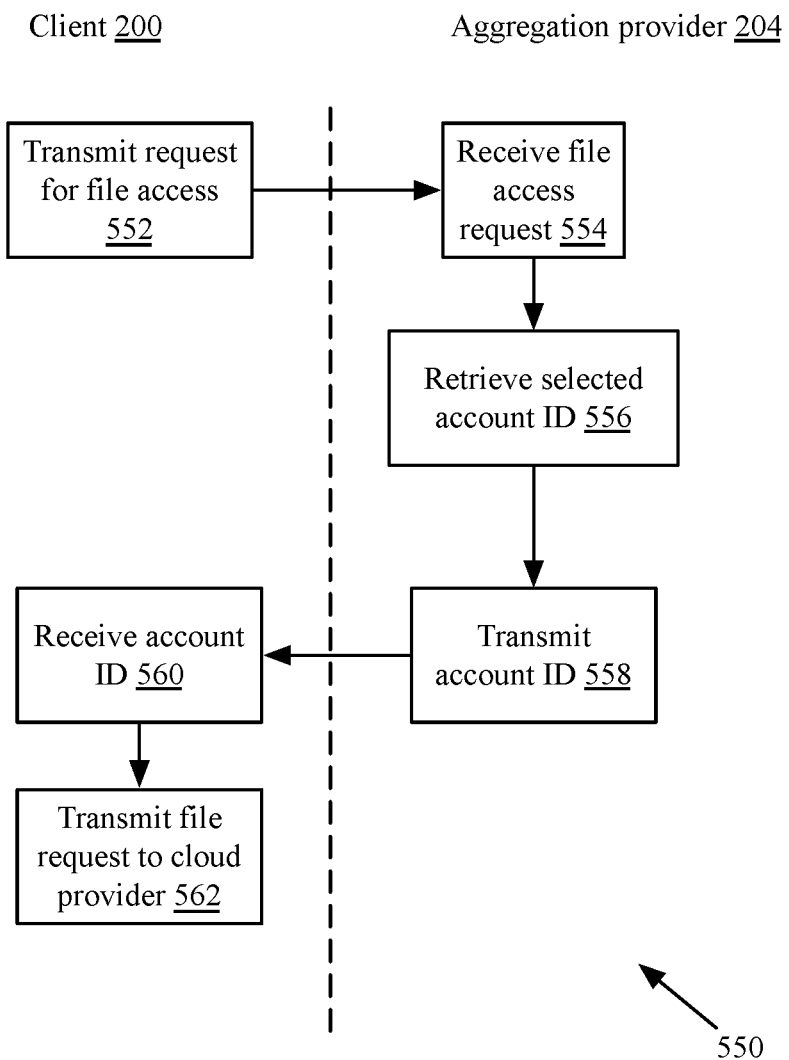

FIG. 5E is a flow chart of an implementation of a method 550 for cloud storage aggregation and management, with metadata and aggregation information stored at an aggregation provider 204. At step 552, a client device 200 may transmit a request for file access to the aggregation provider. The request may be to retrieve, replace, or delete a previously synchronized or backed up file. The request may comprise metadata of the file, such as a cryptographic hash result or name of the file. The request may also include a device, user, or account identifier, or other authentication information.

At step 554, the aggregation provider may receive the file access request. As discussed above, in some implementations, receiving the request may comprise performing a handshaking or authentication procedure to verify the identity of the computing device and/or user.

At step 556, the aggregation provider may retrieve, from a local database, an identification of a storage provider and/or address at which the file is stored. At step 558, the aggregation provider may transmit the identification and/or address to the client device. At step 560, the client device may receive the identification, and at step 562, may transmit a file access request to the identified storage provider or address. The file access request may be via an API corresponding to the storage provider or include one or more commands for accessing or processing the file.

In other implementations, file access may be performed by the synchronization client on the device. For example, in implementations in which files are stored as symlinks in an aggregated folder or monitored folders, a user may delete a file from the aggregated folder. This may trigger deletion of the corresponding file or symlink in a monitored folder. An application associated with the storage provider may identify the deletion of the file, and may transmit a request to the cloud storage provider to delete the corresponding backed up or synchronized copy of the file at the cloud storage provider.

Figure 5F:
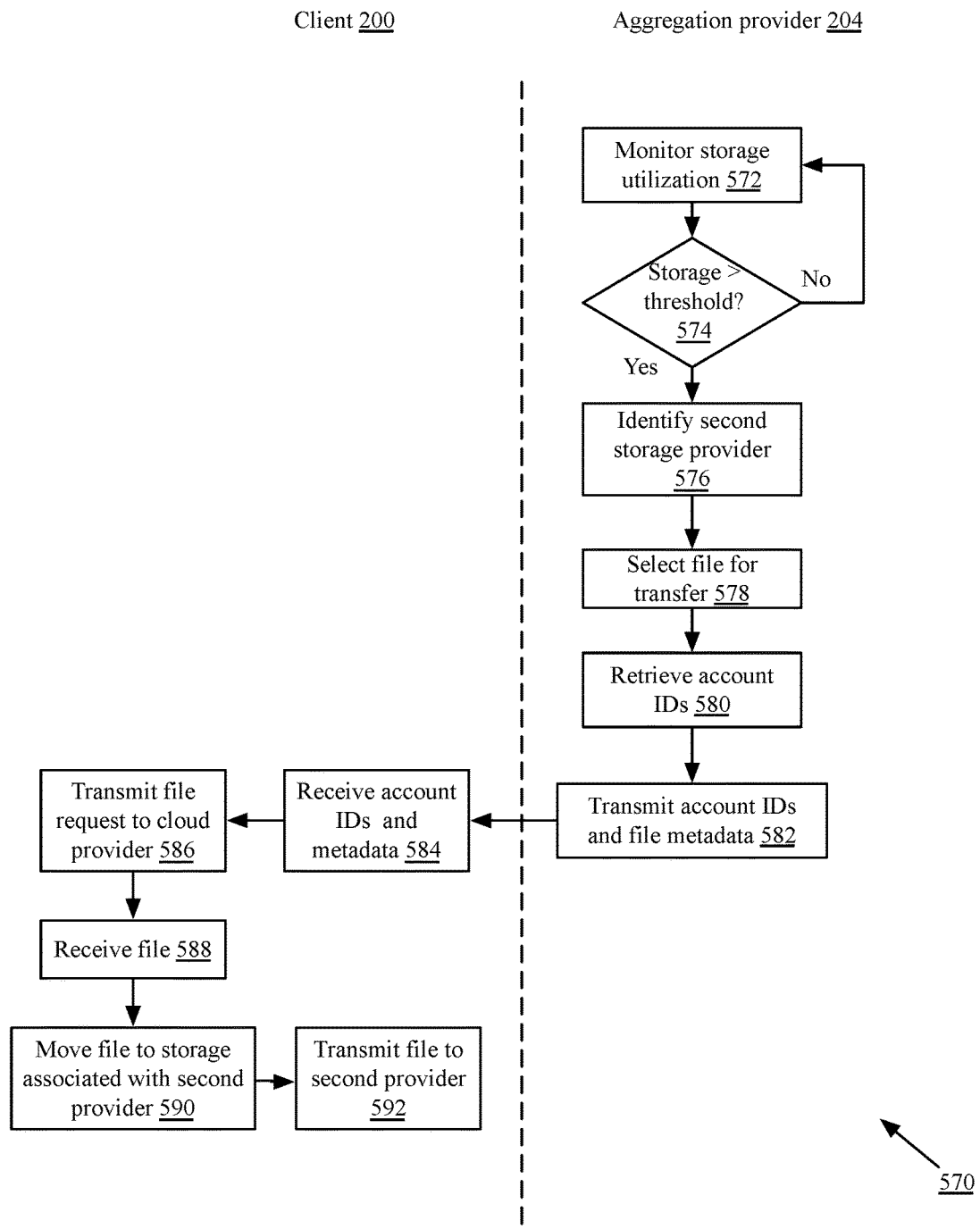

FIG. 5F is a flow chart of an implementation of a method 570 for management of aggregated cloud storage, including rebalancing storage levels. Although shown with several steps performed by an aggregation provider, in many implementations, the method may be performed by a synchronization client on a client device.

At step 572, the synchronization client or aggregation provider may monitor storage utilization on each account of the device at a plurality of cloud storage providers. Monitoring storage utilization may comprise identifying a total amount stored in each of a plurality of monitored folders at the client device, transmitting a request to each cloud storage provider for a current storage level or status, or otherwise verifying storage amounts.

At step 574, the synchronization client or aggregation provider may determine if the storage utilization of an account at a first storage provider is above a threshold (e.g. set amount, percentage, etc.). If not, then steps 572-574 may be periodically repeated. If the storage utilization of the account is above the threshold, then at step 576 in some implementations, the synchronization client or aggregation provider may identify an account at a second storage provider with a storage utilization below the threshold. If multiple accounts have storage utilization less than the threshold, then in some implementations, the synchronization client or aggregation provider may select an account randomly. In other implementations, the synchronization client or aggregation provider may select an account with the least free space, to ensure a largest contiguous free space is maintained.

At step 578, the synchronization client or aggregation provider may select one or more files to transfer from the first storage provider to the second storage provider. The synchronization client or aggregation provider may use any criteria to select the one or more files, including by size (e.g. smallest files, or largest files), by time of usage (e.g. most recently used or least recently used), by file type, or any other criteria. For example, in some implementations, the synchronization client or aggregation provider may select one or more files equal in size to the amount by which the storage utilization of the account at the first provider exceeds the threshold. In other implementations, the synchronization client or aggregation provider may select additional files, to bring the utilization to below the threshold after transferring the files.

At step 580, in some implementations, the aggregation provider may retrieve account identifiers or addresses of accounts associated with the first and second cloud storage providers. At step 582, the aggregation provider may transmit the account identifiers and file metadata of the selected files to the client device. At step 584, the client device may receive the account identifiers and file metadata. In other implementations in which the method is performed by a synchronization client, steps 580-584 may be skipped.

At step 586, in some implementations in which the files are not stored locally, the synchronization client may transmit a request to the first cloud provider for the identified files. For example, in many implementations, files may be backed up on a cloud storage service but not synchronized to the client device to reduce storage utilization at the client device (particularly for backups or infrequently accessed files). In such implementations, the client device may first retrieve the files from the first cloud provider, receiving the files at step 588. In other implementations in which the files are locally stored at the client device, steps 586-588 may be skipped.

At step 590, the synchronization client may move the files from storage associated with the first storage provider to storage associated with the second provider. In some implementations, this may include moving the files from a first monitored folder to a second monitored folder. In other implementations, this may include changing an identifier in a synchronization database from associating the file with the first storage provider to associating the file with the second storage provider.

Responsive to moving the files, at step 592, the client device may transmit the files to the second storage provider. As discussed above, this may be performed by the synchronization client, or by an application of the second storage provider responsive to detecting the files being placed in the monitored folder associated with the second storage provider. Similarly, at step 592, the client device may transmit a request to delete the files from the first storage provider. The request may similarly be generated by the synchronization client or by an application of the first storage provider responsive to detecting removal of the files from a monitored folder associated with the first storage provider.

Accordingly, in one aspect, the present disclosure is directed to a method for aggregation of a plurality of cloud storage locations. The method includes receiving, by a storage manager from a client device, metadata of a file stored at the client device and designated for synchronization. The method also includes selecting, by the storage manager, an account associated with the client device at a first cloud storage provider of a plurality of cloud storage providers. The method further includes storing, by the storage manager, the metadata of the file and an identification of the selected account in a storage device associated with the storage manager. The method also includes transmitting, by the storage manager to the client device, the identification of the selected account, receipt of the identification causing the client device to transmit the file to the first cloud storage provider. The method also includes subsequently receiving, by the storage manager from the client device, a request for the file. The method further includes retrieving, by the storage manager, the metadata of the file stored in the storage device and the identification of the selected account, responsive to receipt of the request; and transmitting, by the storage manager to the client device, the identification of the selected account and the metadata of the file, receipt of the identification and the metadata causing the client device to transmit a request for the file to the first cloud storage provider.

In some implementations, the metadata of the file comprises a directory path for the file in a storage device of the client device, and receipt of the identification of the selected account further causes the client device to modify the directory path for the file according to a policy associated with the first cloud storage provider. In a further implementation, receipt of the identification of the selected account further causes the client device to copy the file from a first directory to a second directory associated with the first cloud storage provider.

In some implementations, selecting the account associated with the client device at the first cloud storage provider further comprises comparing a storage level of accounts associated with the client device at each of the plurality of cloud storage providers. In a further implementation, the method includes selecting the account associated with the client device at the first cloud storage provider, responsive to a storage level of the account associated with the client device at the first cloud storage provider being below an average storage level of the accounts associated with the client device at each of the plurality of cloud storage providers. In another further implementation, the method includes selecting the account associated with the client device at the first cloud storage provider, responsive to determining that an account associated with the client device at a second cloud storage provider has a larger amount of free space than the account associated with the client device at the first cloud storage provider.

In some implementations of the method, transmitting the identification of the selected account and the metadata of the file further comprises transmitting a command to initiate retrieval of the file from the first cloud storage provider. In other implementations, the method includes determining, by the storage manager, that a storage utilization of the account associated with the client device at the first cloud storage provider exceeds a threshold; identifying, by the storage manager, a second cloud storage provider of the plurality of cloud storage providers having an account associated with the client device with a storage utilization under the threshold. The method also includes, responsive to the determination, transmitting, by the storage manager to the client device, the identification of the account at the first cloud storage provider and metadata of at least one file stored at the first cloud storage provider, receipt of the identification of the account at the first cloud storage provider and metadata of the at least one file causing the client device to retrieve the at least one file from the first cloud storage provider; and transmitting, by the storage manager to the client device, an identification of the account at the second cloud storage provider and metadata of the at least one file, receipt of the identification of the account at the second cloud storage provider and metadata of the at least one file causing the client device to transmit the at least one file to the second cloud storage provider.

In another aspect, the present disclosure is directed to a system for aggregation of a plurality of cloud storage locations. The system includes a server, in communication with a client device, comprising a processor executing a storage manager and a metadata storage device. The storage manager is configured for receiving, from the client device, metadata of a file stored at the client device and designated for synchronization; and selecting an account associated with the client device at a first cloud storage provider of a plurality of cloud storage providers. The storage manager is also configured for storing, in the metadata storage device, the metadata of the file and an identification of the selected account. The storage manager is also configured for transmitting, to the client device, the identification of the selected account, receipt of the identification causing the client device to transmit the file to the first cloud storage provider. The storage manager is also configured for subsequently receiving, from the client device, a request for the file; and retrieving the metadata of the file and the identification of the selected account from the metadata storage device, responsive to receipt of the request. The storage manager is also configured for transmitting, to the client device, the identification of the selected account and the metadata of the file, receipt of the identification and the metadata causing the client device to transmit a request for the file to the first cloud storage provider.

In some implementations, the metadata of the file comprises a directory path for the file in a storage device of the client device, and receipt of the identification of the selected account further causes the client device to modify the directory path for the file according to a policy associated with the first cloud storage provider. In a further implementation, receipt of the identification of the selected account further causes the client device to copy the file from a first directory to a second directory associated with the first cloud storage provider.

In some implementations, the storage manager is further configured for comparing a storage level of accounts associated with the client device at each of the plurality of cloud storage providers. In a further implementation, the storage manager is further configured for selecting the account associated with the client device at the first cloud storage provider, responsive to a storage level of the account associated with the client device at the first cloud storage provider being below an average storage level of the accounts associated with the client device at each of the plurality of cloud storage providers. In another further implementation, the storage manager is further configured for selecting the account associated with the client device at the first cloud storage provider, responsive to determining that an account associated with the client device at a second cloud storage provider has a larger amount of free space than the account associated with the client device at the first cloud storage provider.

In some implementations, the storage manager is further configured for transmitting a command to the client device to initiate retrieval of the file from the first cloud storage provider. In other implementations, the storage manager is further configured for determining that a storage utilization of the account associated with the client device at the first cloud storage provider exceeds a threshold. The storage manager is also configured for identifying a second cloud storage provider of the plurality of cloud storage providers having an account associated with the client device with a storage utilization under the threshold. The storage manager is also configured for, responsive to the determination, transmitting, to the client device, the identification of the account at the first cloud storage provider and metadata of at least one file stored at the first cloud storage provider, receipt of the identification of the account at the first cloud storage provider and metadata of the at least one file causing the client device to retrieve the at least one file from the first cloud storage provider; and transmitting, by the storage manager to the client device, an identification of the account at the second cloud storage provider and metadata of the at least one file, receipt of the identification of the account at the second cloud storage provider and metadata of the at least one file causing the client device to transmit the at least one file to the second cloud storage provider.

In still another aspect, the present disclosure is directed to a method for aggregation of a plurality of cloud storage locations. The method includes transmitting, by a client device to a storage manager executed by a server, metadata of a file stored at the client device and designated for synchronization. The method also includes receiving, by the client device from the storage manager, an identification of an account associated with the client device at a first cloud storage provider of a plurality of cloud storage providers, the account selected by the storage manager. The method further includes transmitting the file, by the client device, to the first cloud storage provider for backup. The method also includes subsequently transmitting, by the client device to the storage manager, a request for the file. The method includes receiving, by the client device from the storage manager, the identification of the selected account and the metadata of the file; and transmitting a request for the file to the first cloud storage provider, by the client device, responsive to receipt of the identification and the metadata.

In some implementations, transmitting the metadata of the file to the storage manager further comprises transmitting a directory path for the file in a storage device of the client device to the storage manager; and transmitting the file to the first cloud storage provider for backup further comprises modifying the directory path for the file from a first directory to a second directory associated with the first cloud storage provider. In a further implementation, the method includes receiving the file, by the client device from the first cloud storage provider; storing the received file, by the client device, in the second directory associated with the first cloud storage provider; and modifying the directory path for the file from the second directory to the first directory according to the metadata of the file received from the storage manager.

In some implementations, the method includes receiving, by the client device from the storage manager to the client device, the identification of the account at the first cloud storage provider and metadata of at least one file stored at the first cloud storage provider, transmitted by the storage manager responsive to a determination that a storage utilization of the account associated with the client device at the first cloud storage provider exceeds a threshold. The method also includes retrieving, by the client device, the at least one file from the first cloud storage provider responsive to the receipt of the identification of the account at the first cloud storage provider and metadata of the at least one file. The method further includes receiving, by the client device from the storage manager, metadata of the at least one file and an identification of an account associated with the client device at a second cloud storage provider of the plurality of cloud storage providers selected by the storage manager responsive to having a storage utilization under the threshold; and transmitting, by the client device to the second cloud storage provider, the at least one file for backup.

In still another aspect, the present disclosure is directed to a method for aggregation of a plurality of cloud storage locations. The method includes receiving, by a storage manager from a client device, metadata of a first file stored at the client device and designated for synchronization, the metadata identifying a first type of file. The method also includes identifying, by the storage manager, a first cloud storage provider of a plurality of cloud storage providers having an increased storage policy corresponding to the first type of file. The method also includes selecting, by the storage manager, an account associated with the client device at the first cloud storage provider of the plurality of cloud storage providers. The method further includes storing, by the storage manager, the metadata of the file and an identification of the selected account in a storage device associated with the storage manager; and transmitting, by the storage manager to the client device, the identification of the selected account, receipt of the identification causing the client device to transmit the file to the first cloud storage provider.

In some implementations, the first type of file is an image file. In some implementations, the method includes identifying, by the storage manager, a second file associated with the client device and stored at a second cloud storage provider of the plurality of cloud storage providers, the second file of the first type of file; and transferring, by the storage manager, the second file from the second cloud storage provider to the first cloud storage provider, responsive to the first cloud storage provider having the increased storage policy corresponding to the first type of file. In a further implementation, transferring the second file from the second cloud storage provider to the first cloud storage provider further comprises transmitting, by the storage manager to the client device, an identification of an account at the second cloud storage provider associated with the client device and metadata of the second file, receipt of the identification causing the client device to retrieve the second file from the second cloud storage provider; and transmitting, by the storage manager to the client device, the identification of the selected account at the first cloud storage provider and metadata of the second file, receipt of the identification causing the client device to transmit the second file to the first cloud storage provider. In another further implementation, the method includes identifying, by the storage manager, that an account associated with the client device at the second cloud storage provider is above a data storage threshold; and wherein transferring the second file from the second cloud storage provider to the first cloud storage provider is performed responsive to the identification.

In some implementations, the first type of file is an audio file. In a further implementation, the increased storage policy comprises replacing low bitrate audio files with corresponding high bitrate audio files.

In some implementations, the method includes calculating, by the storage manager, an aggregated amount of storage of accounts associated with the client device at the plurality of cloud storage providers; identifying, by the storage manager, a first total data size of files of the client device designated for synchronization; identifying, by the storage manager, a second total data size of files of the client device of the first type of file designated for synchronization; and transmitting, by the storage manager to the client device, an available storage amount comprising the aggregated amount of storage minus a difference between the first total data size and the second total data size.

In another aspect, the present disclosure is directed to a system for aggregation of a plurality of cloud storage locations. The system includes a server, in communication with a client device, comprising a processor executing a storage manager and a metadata storage device. The storage manager is configured for receiving, from the client device, metadata of a first file stored at the client device and designated for synchronization, the metadata identifying a first type of file. The storage manager is also configured for identifying a first cloud storage provider of a plurality of cloud storage providers having an increased storage policy corresponding to the first type of file. The storage manager is also configured for selecting an account associated with the client device at the first cloud storage provider of the plurality of cloud storage providers. The storage manager is also configured for storing the metadata of the file and an identification of the selected account in a storage device associated with the storage manager, and transmitting, to the client device, the identification of the selected account, receipt of the identification causing the client device to transmit the file to the first cloud storage provider.

In some implementations of the system, the first type of file is an image file. In some implementations, the storage manager is further configured for identifying a second file associated with the client device and stored at a second cloud storage provider of the plurality of cloud storage providers, the second file of the first type of file; and transferring the second file from the second cloud storage provider to the first cloud storage provider, responsive to the first cloud storage provider having the increased storage policy corresponding to the first type of file. In a further implementation, the storage manager is further configured for: transmitting, to the client device, an identification of an account at the second cloud storage provider associated with the client device and metadata of the second file, receipt of the identification causing the client device to retrieve the second file from the second cloud storage provider; and transmitting, to the client device, the identification of the selected account at the first cloud storage provider and metadata of the second file, receipt of the identification causing the client device to transmit the second file to the first cloud storage provider.

In some implementations, the storage manager is further configured for identifying that an account associated with the client device at the second cloud storage provider is above a data storage threshold; and transferring the second file from the second cloud storage provider to the first cloud storage provider, responsive to the identification.

In some implementations of the system, the first type of file is an audio file. In a further implementation, the increased storage policy comprises replacing low bitrate audio files with corresponding high bitrate audio files. In some implementations, the storage manager is further configured for calculating an aggregated amount of storage of accounts associated with the client device at the plurality of cloud storage providers; identifying a first total data size of files of the client device designated for synchronization; identifying a second total data size of files of the client device of the first type of file designated for synchronization; and transmitting, to the client device, an available storage amount comprising the aggregated amount of storage minus a difference between the first total data size and the second total data size.

File Fragmentation for Increased Reliability and Security

Figure 6A:
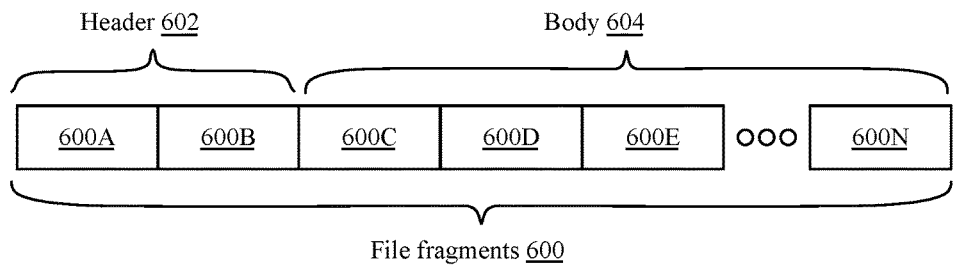
FIG. 6A is a diagram of an implementation of fragmentation of a file.

Aggregation of third-party cloud storage into a single virtual storage device can be enhanced via file fragmenting to provide increased reliability and security. Referring briefly to FIG. 6A, illustrated is a diagram of an implementation of fragmentation of a file. As shown, a file may comprise a header 602 and/or a body 604. In some implementations, a file may also comprise a footer, while in other implementations, the file may comprise raw data and lack a header or footer. The header 602 and/or footer may comprise supplemental data, including file metadata, signatures, or other such information.

A file may be fragmented into a plurality of fragments 600A-600N, referred to generally as segment(s), block(s), or fragment(s) 600. In many implementations, file fragments 600 may be of a predetermined size (e.g. 64 kb, 1 Mb, 2 Mb, 5 Mb, or any other size). For example, during transmission of a large file to a cloud storage provider, the file may be fragmented into sizes smaller than or equal to a maximum transmission unit (MTU). This may allow the fragments to be transmitted without further IP fragmentation by the network stack. The fragments may not all be the same size—typically, as the file size may not divide evenly according to the fragment size, a final fragment 600N may be smaller than other fragments.

In some implementations, the header of the file 602 may be fragmented into multiple fragments. Although shown dividing into two fragments 602A-602B evenly, in some implementations, a fragment may include part of the header 602 and part of the body 604. Dividing the header into multiple fragments may help obfuscate the data by preventing a cloud storage provider from easily reading the full metadata of the file.

In one implementation, fragments or blocks may be distributed among a plurality of cloud storage providers, such that no provider retains a complete copy of a file. Accordingly, even if an individual service is compromised, a malicious actor cannot access the data. In another implementation, fragments may be duplicated and distributed to multiple providers, such that loss of communications to any one provider does not result in inability to access the data. This implementation may be combined with error correction techniques to allow recovery, even with loss of multiple providers. File synchronization may also be faster in these implementations by dividing reading and writing operations among multiple providers.

Figure 6B:
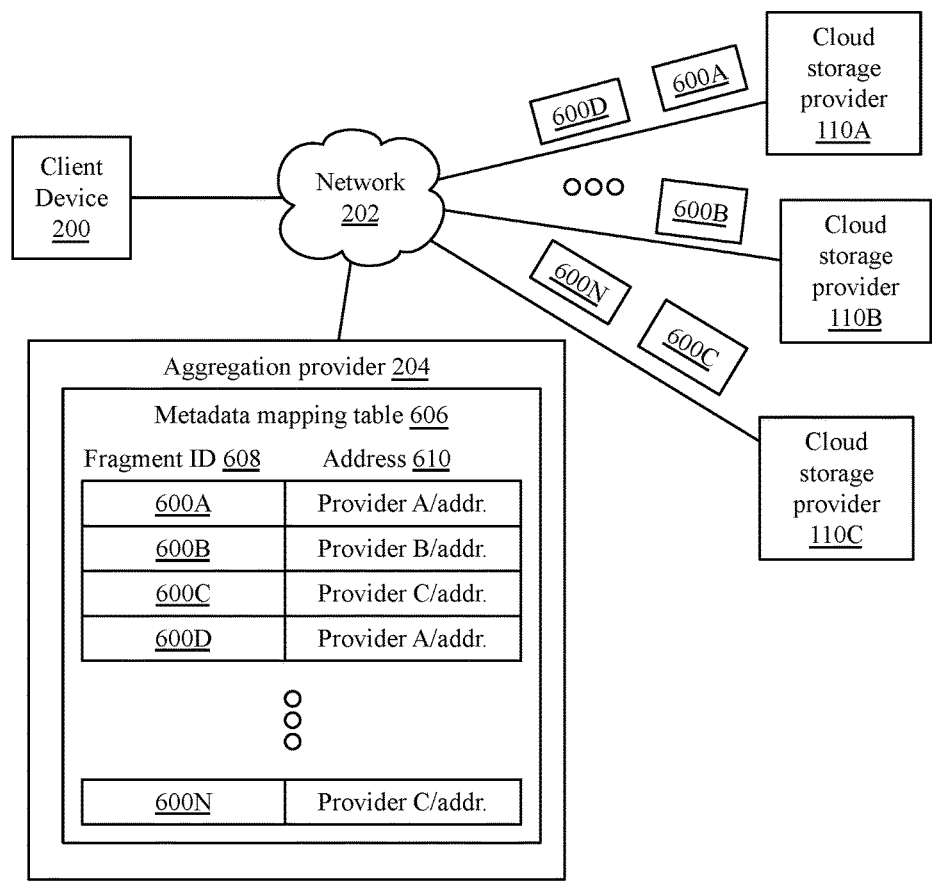
FIG. 6B is an illustration of an implementation of distribution of file fragments to a plurality of cloud storage services.

For example, FIG. 6B is an illustration of an implementation of distribution of file fragments 600A-600N to a plurality of cloud storage services 110A-110C. In one implementation, a synchronization client may fragment a file transmit each successive fragment to different cloud storage providers as shown (e.g. 600A to provider 110A, 600B to provider 110B, 600C to provider 110C, etc.) in round robin or random fashion. Because any cloud storage provider 110 will only have a fraction of the content of the file, and only non-consecutive fragments of the data, if the provider's security is compromised and data is stolen, a malicious actor will not be able to assemble or read the file.

In one implementation, an aggregation provider 204 and/or a synchronization client may maintain a metadata mapping table 606. Mapping table 606 may comprise an ordered index, array, table, database, flat file, or other such data format for storing ordered identifications of fragments 608 and corresponding addresses 610. In some implementations, a synchronization client may use the mapping table to divide a file for synchronization into a plurality of fragments and then concatenate each subset of fragments indicated for a cloud provider into a single fragment "file". For example, after dividing a file into fragments 600A-600N and identifying that a subset of fragments 600A and 600D (and 600G, 600J, etc., not illustrated) are to be directed to a first provider 110A, the synchronization client may concatenate the subset into a single file, which may, in some implementations be identified by a .frag or .part extension or a similar identifier (or, potentially, a generic extension or even a misleading or obfuscating extension, such as .jpg or .txt). In some implementations, the concatenated fragment file may be stored in a monitored folder corresponding to the provider, similar to any other file. A client application of the provider or the synchronization client may then back up the file to the provider, using the same processes as for any other file. In other implementations, each fragment may be separately transferred to the storage providers.

The synchronization client may similarly use the mapping table 606 to retrieve and reassemble or generate the original file, by retrieving the fragments and/or concatenated files, dividing the files into individual fragments if necessary, and re-concatenating the file fragments in order according to the fragment identifiers 608.

Figure 7A:
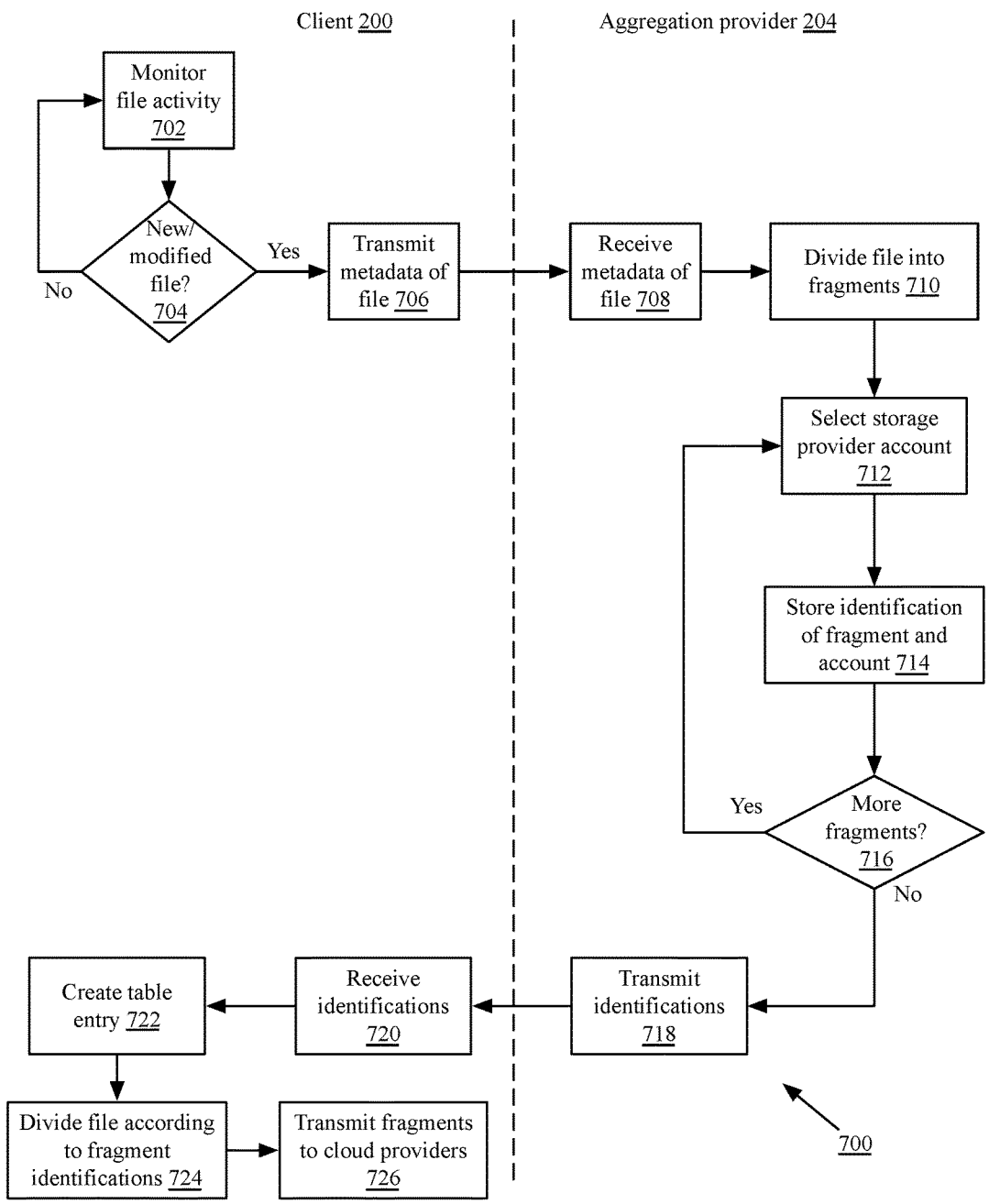
FIG. 7A is a flow chart of an implementation of a method for distribution of file fragments to a plurality of cloud storage services.

FIG. 7A is a flow chart of an implementation of a method 700 for distribution of file fragments to a plurality of cloud storage services. Steps 702-708 may be similar to steps 502-508 discussed above in connection with FIGS. 5A-5D, and may include a synchronization client or file monitor monitoring write activity or the contents of a folder to detect new or modified files, and transmit metadata of the new or modified file to an aggregation provider, or, in some implementations, to a synchronization client. Although shown with steps divided between aggregation provider 204 and client 200, in many implementation, one or more of steps 708-718 may be performed by a synchronization client on a client device.

At step 710, a synchronization client or aggregation provider may divide a file into a plurality of fragments. As discussed above, in many implementations, a file may be divided into fragments of a predetermined size (with a final fragment comprising any remaining bits, and thus likely smaller than the predetermined size), such as a size based on an MTU. Dividing the file into fragments may comprise performing a logical division of the file, rather than actually dividing the file. For example, in some implementations, an aggregation provider or synchronization client may logically divide a file by identifying memory start and end addresses for each fragment, while leaving the file intact in a contiguous region of memory. The fragments may be subsequently read according to the memory start and end addresses during transmission to cloud storage providers.

At step 712, an account associated with the client device at a first cloud storage provider may be selected by the synchronization client or aggregation provider. At step 714, the synchronization client or aggregation provider may store an identification of a fragment and the selected account. The synchronization client or aggregation provider may determine if additional fragments remain in the file at step 716. If so, steps 712-716 may be repeated iteratively for each fragment, with the synchronization client or aggregation provider selecting a next account or storage provider during each iteration (and returning to select the first storage provider after all storage providers have been selected, or after all storage providers having sufficient room to store one or more fragments have been selected). When no more fragments remain unaccounted for, at step 718 in some implementations, an aggregation provider may transmit the identifications of each fragment and corresponding account to the client device, such as in a mapping table as discussed above. The client device may receive the identifications or table at step 720 and store the data at step 722 or create the table entries, in such implementations. In implementations in which the synchronization client divides the file and selects accounts, steps 718-720 may be skipped.

At step 724, the synchronization client may divide the file according to the fragment identifications. In some implementations, as discussed above, the synchronization client may extract each fragment of the file designated for a specific account or storage provider and may concatenate the fragments into a single file. This file may be stored in a monitored folder or transmitted to the cloud storage provider to back up the fragments at step 726. The process may be repeated iteratively for each set of fragments designated for an account or storage provider. In other implementations, each fragment may be transmitted separately to the cloud storage provider. For example, as each file may be IP fragmented to the MTU size during transmission, it may be more efficient in some implementations to store each fragment separately without concatenating fragments designated for a provider.

Figure 7B:
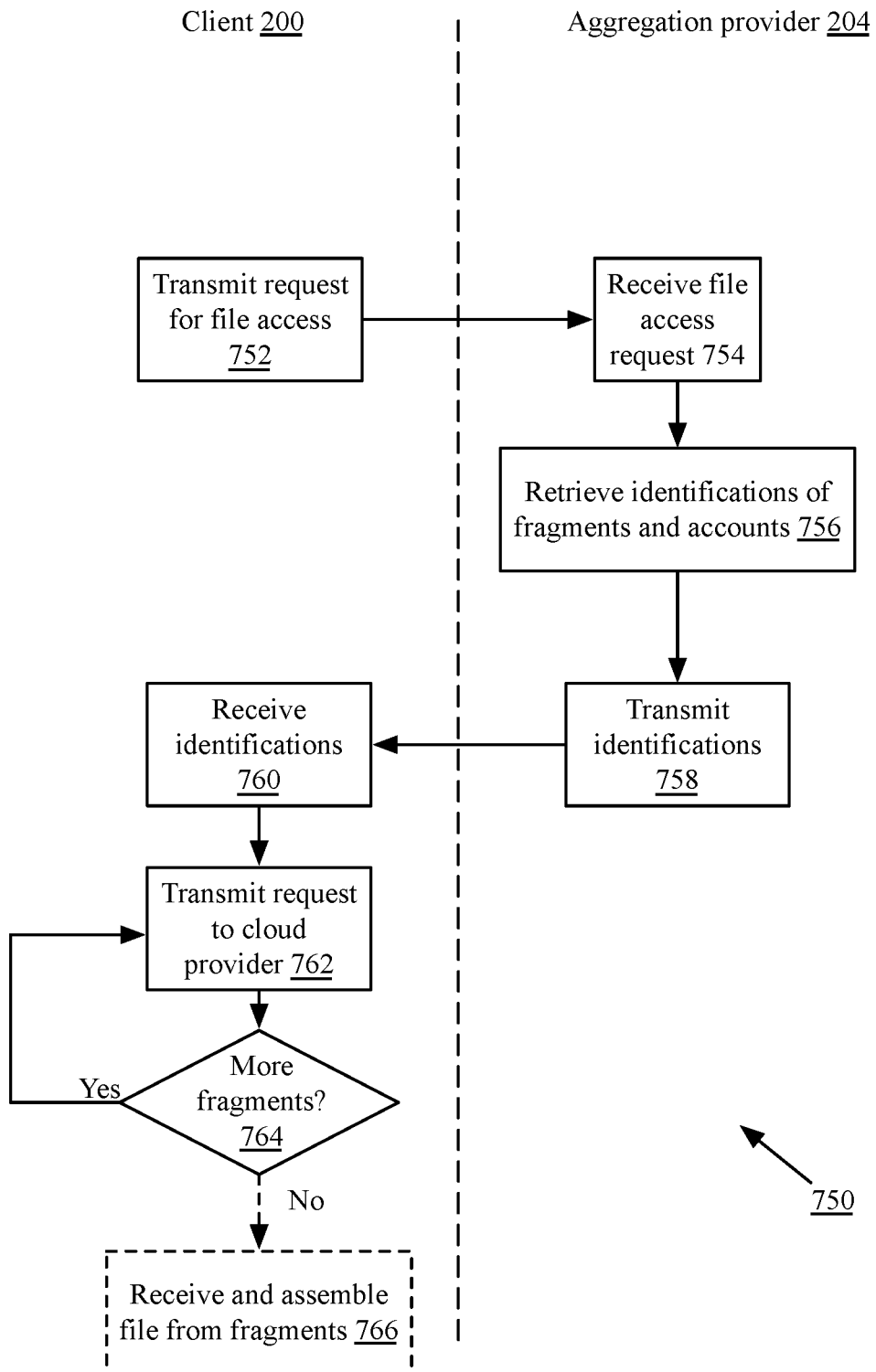
FIG. 7B is a flow chart of an implementation of a method for access to fragmented files distributed across a plurality of cloud storage services.

FIG. 7B is a flow chart of an implementation of a method 750 for access to fragmented files distributed across a plurality of cloud storage services. Although shown with steps performed by an aggregation provider 204, in some implementations, the process may be performed by a synchronization client on a client device. Method 750 is similar in some respects to method 550, discussed above in connection with FIG. 5E.

At step 752, a client device 200 may transmit a request for file access to the aggregation provider. The request may be to retrieve, replace, or delete a previously synchronized or backed up file. The request may comprise metadata of the file, such as a cryptographic hash result or name of the file. The request may also include a device, user, or account identifier, or other authentication information.

At step 754, the aggregation provider may receive the file access request. As discussed above, in some implementations, receiving the request may comprise performing a handshaking or authentication procedure to verify the identity of the computing device and/or user. In implementations in which method 750 is performed by the synchronization client, steps 752-754 may be skipped.

At step 756, the aggregation provider may retrieve, from a local database, identifications of fragments of the file and a corresponding storage provider and/or address at which each fragment is stored. At step 758, the aggregation provider may transmit the identification and/or address to the client device, and at step 760, the client device may receive the identification. In implementations in which the method is performed by the synchronization client, steps 758-760 may be skipped.

At step 762, the synchronization client may transmit a file access request for a first fragment to the identified storage provider or address. The file access request may be via an API corresponding to the storage provider or include one or more commands for accessing or processing the file. In some implementations, as discussed above, the synchronization client may request a fragment file comprising a set of concatenated, non-contiguous fragments of the file. In other implementations, the synchronization client may request each fragment individually. At step 764, the synchronization client may determine if all fragments have been requested. If not, steps 762-764 may be repeated iteratively for each fragment or fragment file.

In some implementations, the request may comprise a request to delete the fragments, and accordingly, no fragments or files may be received from the storage provider. In other implementations, the request may comprise a request to retrieve or download the fragments, and at step 766, the client device may receive the fragments and/or fragment files. The synchronization client may reassemble the original file from the fragments in order according to the mapping table or other received identifications of fragments.

Accordingly, in one aspect, the present disclosure is directed to a method for secure file management in an aggregation of cloud storage services. The method includes receiving, by a storage manager from a client device, metadata of a file stored at the client device and designated for synchronization. The method also includes identifying, by the storage manager, a plurality of fragments of the file; and selecting, by the storage manager, a first account associated with the client device at a first cloud storage provider of a plurality of cloud storage providers and a second account associated with the client device at a second cloud storage provider of the plurality of cloud storage providers. The method further includes selecting, by the storage manager, a first subset of the plurality of fragments of the file and a second subset of the plurality of fragments of the file. The method includes storing, by the storage manager, the metadata of the file, an identification of the first subset and second subset, and an identification of the first selected account and second selected account in a storage device associated with the storage manager. The method also includes transmitting, by the storage manager to the client device, the identification of the first selected account and first subset of the plurality of fragments, receipt of the identification causing the client device to transmit the first subset of the plurality of fragments to the first cloud storage provider; and transmitting, by the storage manager to the client device, the identification of the second selected account and second subset of the plurality of fragments, receipt of the identification causing the client device to transmit the second subset of the plurality of fragments to the second cloud storage provider.

In some implementations, the method includes subsequently receiving, by the storage manager from the client device, a request for the file; and retrieving, by the storage manager, the metadata of the file, the identification of the first subset and second subset, and the identification of the first selected account and second selected account stored in the storage device, responsive to receipt of the request. The method also includes transmitting, by the storage manager to the client device, the identification of the first selected account and first subset of the plurality of fragments, receipt of the identification causing the client device to transmit a request for the first subset of the plurality of fragments to the first cloud storage provider. The method also includes transmitting, by the storage manager to the client device, the identification of the second selected account and second subset of the plurality of fragments, receipt of the identification causing the client device to transmit a request for the second subset of the plurality of fragments to the second cloud storage provider.

In some implementations, identifying the plurality of fragments of the file further comprises dividing the file into a plurality of fragments of a predetermined size. In a further implementation, dividing the file into a plurality of fragments of the predetermined size further comprises dividing the file into the plurality of fragments of the predetermined size and an additional fragment including a remainder of the file. In another further implementation, the predetermined size is smaller than a header of the file.

In some implementations of the method, selecting the first subset of the plurality of fragments of the file and selecting the second subset of the plurality of fragments of the file further comprises distributing alternating fragments of the file to the first subset and second subset. In a further implementation, receipt of the identification of the first selected account and first subset of the plurality of fragments further causes the client device to concatenate the first subset of the plurality of fragments of the file into a first contiguous block.

In another aspect, the present disclosure is directed to a system for secure file management in an aggregation of cloud storage services. The system includes a server comprising a network interface in communication with a client device and a plurality of cloud storage providers, and a processor executing a storage manager. The storage manager is configured to receive, from the client device, metadata of a file stored at the client device and designated for synchronization; and identify a plurality of fragments of the file. The storage manager is also configured to select a first account associated with the client device at a first cloud storage provider of the plurality of cloud storage providers and a second account associated with the client device at a second cloud storage provider of the plurality of cloud storage providers. The storage manager is also configured to select a first subset of the plurality of fragments of the file and a second subset of the plurality of fragments of the file. The storage manager is also configured to store the metadata of the file, an identification of the first subset and second subset, and an identification of the first selected account and second selected account in a storage device associated with the storage manager. The storage manager is also configured to transmit, to the client device, the identification of the first selected account and first subset of the plurality of fragments, receipt of the identification causing the client device to transmit the first subset of the plurality of fragments to the first cloud storage provider; and transmit, to the client device, the identification of the second selected account and second subset of the plurality of fragments, receipt of the identification causing the client device to transmit the second subset of the plurality of fragments to the second cloud storage provider.

In some implementations, the storage manager is further configured to subsequently receive, from the client device, a request for the file. The storage manager is also configured to retrieve the metadata of the file, the identification of the first subset and second subset, and the identification of the first selected account and second selected account stored in the storage device, responsive to receipt of the request. The storage manager is also configured to transmit, to the client device, the identification of the first selected account and first subset of the plurality of fragments, receipt of the identification causing the client device to transmit a request for the first subset of the plurality of fragments to the first cloud storage provider; and transmit, to the client device, the identification of the second selected account and second subset of the plurality of fragments, receipt of the identification causing the client device to transmit a request for the second subset of the plurality of fragments to the second cloud storage provider.

In some implementations, the storage manager is further configured to divide the file into a plurality of fragments of a predetermined size. In a further implementation, the storage manager is further configured to divide the file into the plurality of fragments of the predetermined size and an additional fragment including a remainder of the file. In another further implementation, the predetermined size is smaller than a header of the file.

In some implementations, the storage manager is further configured to distribute alternating fragments of the file to the first subset and second subset. In a further implementation, receipt of the identification of the first selected account and first subset of the plurality of fragments further causes the client device to concatenate the first subset of the plurality of fragments of the file into a first contiguous block, concatenate the second subset of the plurality of fragments of the file into a second contiguous block. In a still further implementation, the client device is further configured to concatenate the first contiguous block and the second contiguous block.

In another aspect, the present disclosure is directed to a method for secure file management in an aggregation of cloud storage services. The method includes identifying for synchronization, by a synchronization client of a client device, a file stored at the client device. The method also includes transmitting, by the synchronization client to a storage manager, metadata of the identified file. The method further includes receiving, by the synchronization client from the storage manager, an identification of a first account associated with the client device at a first cloud storage provider of a plurality of cloud storage providers and an identification of a first subset of a plurality of fragments of the file. The method also includes receiving, by the synchronization client from the storage manager, an identification of a second account associated with the client device at a second cloud storage provider of the plurality of cloud storage providers and an identification of a second subset of a plurality of fragments of the file; and transmitting, by the synchronization client, the first subset of the plurality of fragments to the first cloud storage provider, and the second subset of the plurality of fragments to the second cloud storage provider.

In some implementations, the plurality of fragments comprise a first set of fragments of a predetermined size, and an additional fragment including a remainder of the file. In a further implementation, the predetermined size is smaller than a header of the file. In some implementations, the method includes subsequently transmitting, by the synchronization client to the storage manager, a request for the file. The method also includes receiving, by the synchronization client from the storage manager, the identification of the first selected account and first subset of the plurality of fragments, and the identification of the second selected account and second subset of the plurality of fragments. The method also includes transmitting, by the synchronization client, a request for the first subset of the plurality of fragments to the first cloud storage provider. The method further includes receiving, by the synchronization client, the first subset of the plurality of fragments from the first cloud storage provider. The method also includes transmitting, by the synchronization client, a request for the second subset of the plurality of fragments to the second cloud storage provider. The method further includes receiving, by the synchronization client, the second subset of the plurality of fragments from the second cloud storage provider; and reassembling, by the synchronization client, the first subset of the plurality of fragments and the second subset of the plurality of fragments to generate the file.

In a further implementation of the method, reassembling the first subset of the plurality of fragments of the file and the second subset of the plurality of fragments of the file further comprises concatenating alternating fragments of the first subset and second subset to generate the file. In another further implementation of the method, reassembling the first subset of the plurality of fragments of the file and the second subset of the plurality of fragments of the file further comprises concatenating fragments of the first subset into a first contiguous block, concatenating the second subset of the plurality of fragments of the file into a second contiguous block, and concatenating the first contiguous block and the second contiguous block.

Non-Standard File Fragmentation for File Obfuscation

Figure 8A:
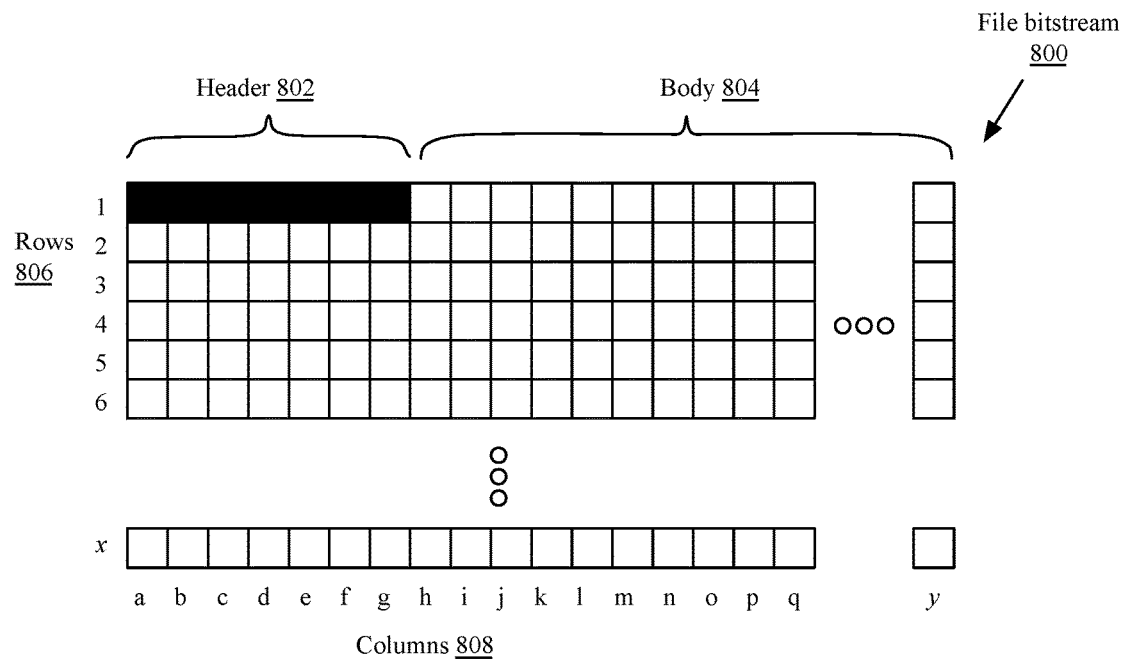
FIGS. 8A and 8B are illustrations of an implementation of obfuscation of a file via rotation or comb filtering of a bitstream.

Aggregation of third-party cloud storage into a single virtual storage device can also be enhanced via file fragmenting in a non-standard method such that file headers and metadata are divided across separate fragments. FIG. 8A is an illustration of an embodiment of an example of a file bitstream 800, considered as an array or block having a height of x rows, and a width of y columns 808. x and y may be any values. For example, y may comprise a width of a memory read bus, allowing an entire row 806 of the bitstream to be read at once. In many implementations, the array or block may be considered an abstraction of a bitstream 800 as a set of segments of y length, each segment representing a row 806.

In many implementations, the array representation of the bitstream may be read from left to right, top to bottom, row by row. Accordingly, the bitstream 800 may comprise a header 802 and a body 804. Although header 802 is shown with a length of 8 bits, in practice, headers 802 may be significantly longer.

In typical fragmentation processes, the bitstream may be may be read from a starting bit at the beginning of the header 802, into the body 804 up to a predetermined fragment size (e.g. an MTU, as discussed above). Accordingly, unless the header exceeds the fragment size, the first fragment may include the entire header 802. Additionally, each fragment will contain a segment of data of the file, in order. If the data segment is human-readable, a malicious actor gaining access to even a single fragment may be able to obtain useful information, such as user names, passwords, addresses, etc.

Figure 8B:
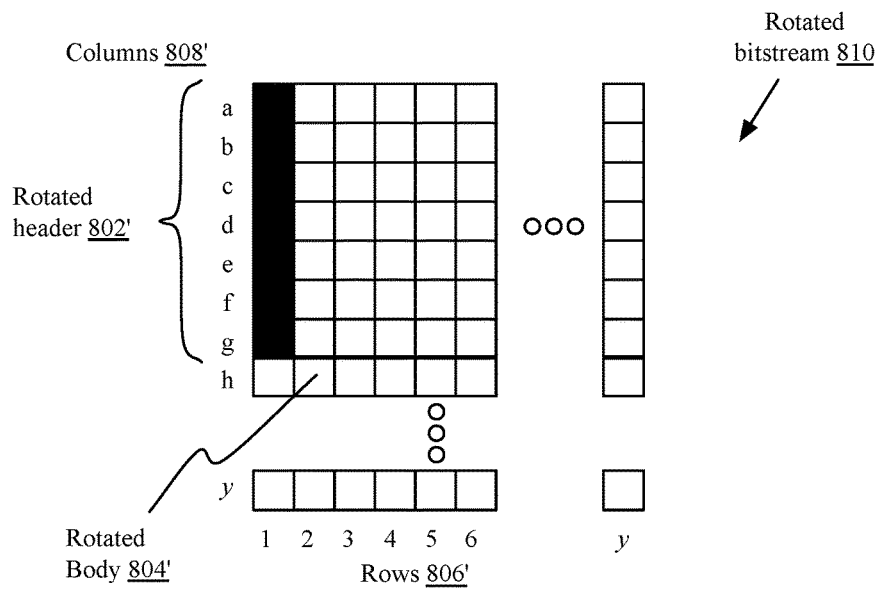

Accordingly, in one implementation, a file may be fragmented in a non-standard or rotated method, such that each bit within a fragment is not adjacent to any bit to which it is normally adjacent in the bitstream 800. Specifically, referring to FIG. 8B, illustrated is an embodiment of a rotated bitstream 810 within the array. Rather than writing data into the array left to right, top to bottom, and reading data the same way, data may be written into the array top to bottom, and left to right. This transposes columns 808' and rows 806' as shown, such that a second bit of header 802 (originally at position b, 1 in FIG. 8A) appears in the first column of the second row (e.g. at position 1, b in FIG. 8B). The array may be read and fragmented normally, left to right, top to bottom, such that the first fragment will include the first bit of the header 802; then a bit of the body 804 that previously appeared at row 2, column a; then a bit of the body 804 that previously appeared at row 3, column a, etc. Thus, no bit within the fragment is adjacent to a bit to which it was originally adjacent within the bitstream, obfuscating the header metadata and any human-readable data within the file. The file may be defragmented in a reverse manner, by writing the fragments to the array left to right, top to bottom, and then reading the fragments top to bottom, left to right.

Although shown as arrays for clarity of explanation, the same result may be achieved via a comb filter. For example, in many implementations, a filter may be repeatedly applied such that a first portion of the bitstream is read (e.g. n elements, such as 1 bit) and a second portion of the bitstream is skipped (e.g. y−1 bits, in the example of FIGS. 8A and 8B). The output bitstream may be stored as a rotated fragment of the file. The process may be repeated for additional fragments by offsetting the filter (e.g. skipping i−1 bits, then reading 1 bit and skipping y−1 bits, where i equals the fragment number), or may be performed in parallel via a number (e.g. y) filters, each similarly offset. To defragment the file, a first portion of each fragment may be read (e.g. n elements, such as 1 bit), then a second portion of each fragment (e.g. a next bit), etc., until the file is reassembled.

For example, in one implementation, the client may extract a first subset of the file comprising every $n^{th}$ element. The client may also extract a second subset of the file comprising every $n^{th}$ element, offset by one element. This may be repeated with additional offsets for additional subsets as needed.

In another implementation, an inverse multiplexer (e.g. one input, multiple outputs) may be used to extract the subsets. For example, a bitstream may be input into the inverse multiplexer with the first element (e.g. 1 bit or a group of bits) output on a first output, such as bit #1. A second element may be output on a second output, such as bit #2. A third element may be output on a third output, such as bit #3. Each further input element may be directed to a successive output of the inverse multiplexer until reaching the final output, at which point the process may repeat with the next input element directed to the first output. Accordingly, a number of fragments equal to the number of outputs may be generated. Similarly, to reverse the process and reassemble the file, the fragments may be input to a multiplexer having multiple inputs (e.g. one per fragment) and one output. The multiplexer may read each element from successive inputs in turn and output the element on the single output, regenerating the original bitstream.

Although discussed as individual bits, in many implementations, other segment sizes may be selected to pass the comb filter, such as 4 bits, 1 byte, 8 bytes, or any other value. Similarly, although discussed as y−1 bits, in many implementations, other segment sizes may be skipped, such as 31 bits, 63 bits, 15 bytes, or any other such value.

Figure 9:
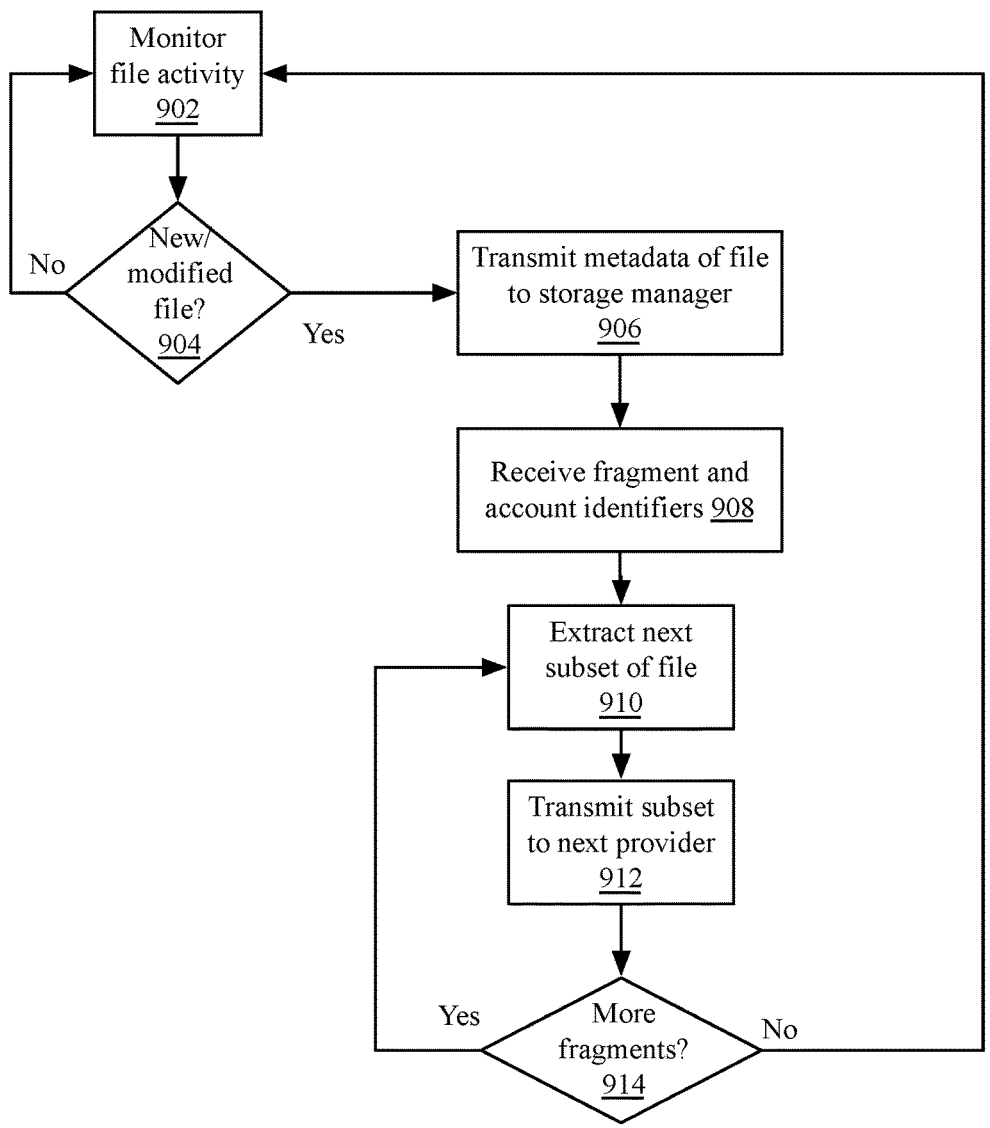
FIG. 9 is a flow chart of an implementation of a method for obfuscation of a file.

FIG. 9 is a flow chart of an implementation of a method 900 for obfuscation of a file. At step 902, in some implementations, a synchronization client or file monitor may monitor file activity to detect new or modified files. For example, the synchronization client or file monitor may monitor disk write activities, or may compare contents of a folder to a previous time, as discussed above. At step 904, the synchronization client or file monitor may determine if a file has been modified or created. If not, steps 902-904 may be periodically repeated.

At step 906, in some implementations, the synchronization client or file monitor may transmit metadata of a file to a storage manager or aggregation provider. The storage manager or aggregation provider may determine a fragmentation scheme and to which provider(s) the fragments should be directed, as discussed above in connection with steps 710-716 of FIG. 7A. The storage manager or aggregation provider may transmit a mapping table or similar identifiers of fragments and corresponding accounts or cloud storage providers to the client at step 908. In other implementations, step 906 may be performed by the synchronization client.

At step 910, the synchronization client may extract a first subset of the file to generate a first fragment. In some implementations, extracting the first subset may comprise using a comb filter or extracting a first portion of the file of x bits and skipping a second portion of the file of y bits, and repeating the process until reaching the end of the file or a predetermined fragment size. In other implementations, as discussed above, the file may be written to an array with one write orientation (e.g. left to right, top to bottom), and then read from the array with an orthogonal read orientation (e.g. top to bottom, left to right).

At step 912, in some implementations, the extracted subset or set of non-contiguous fragments may be transmitted to a first cloud storage provider. In some implementations, as discussed above, transmitting the extracted subset may comprise storing a file in a monitored folder, or transmitting a command in a corresponding API of the storage provider to store the fragment. In some implementations, prior to transmission of the extracted subset, the synchronization client may encrypt the extracted subset, for example, using a secure hash algorithm (SHA) implementation such as SHA-256; an advanced encryption standard (AES) implementation, such as AES-256.

At step 914, the synchronization client may determine if additional fragments need to be generated from the file. If so, then steps 910-914 may be repeated iteratively. As discussed above, this may comprise advancing a comb filter by an offset (e.g. (i−1)*x bits, where i represents the iteration and x represents the size of the extracted first portion, in some implementations. In other implementations, this may comprise reading a next column or row of a rotated array. At each iteration of step 912, the extracted subset may be sent to a next storage provider, looping through a set of accounts at a plurality of cloud storage providers as discussed above.

Accordingly, in one aspect, the present disclosure is directed to a method for obfuscation of data via an aggregation of cloud storage services. The method includes identifying, by a synchronization client of a client device, a file for transfer to an aggregation of a plurality of a cloud storage services. The method also includes extracting, by the synchronization client, a first subset of the file comprising every $n^{th}$ element. The method also includes transmitting, by the synchronization client, the first subset of the file to a first cloud storage service of the plurality of cloud storage services. The method further includes extracting, by the synchronization client, a second subset of the file comprising every $n^{th}$ element, offset by one. The method also includes transmitting, by the synchronization client, the second subset of the file to a second cloud storage service of the plurality of cloud storage services. The method also includes transmitting, by the synchronization client, metadata of the file and an identification of the first subset, first cloud storage service, second subset, and second cloud storage service, to a third cloud storage service.

In some implementations, each element comprises a predetermined number of bits. In some implementations of the method, extracting the first subset of the file further comprises inverse multiplexing a bitstream of the file into a plurality of subsets. In other implementations of the method, extracting the first subset of the file further comprises loading the file into an array having predetermined number of columns; and reading a first column of the array. In a further implementation, extracting the second subset of the file further comprises reading a second column of the array.

In some implementations, the method includes subsequently transmitting a request for the file, by the synchronization client to the third cloud storage service, the request comprising the metadata of the file; and receiving, by the synchronization client from the third cloud storage service, identifications of the first subset, first cloud storage service, second subset, and second cloud storage service. In a further implementation, the method includes retrieving, by the synchronization client, the first subset from the first cloud storage service. The method also includes retrieving, by the synchronization client, the second subset to the second cloud storage service; and assembling the file, by the synchronization client, from the first subset and second subset. In a still further implementation, the method includes multiplexing the first subset and second subset into a single bitstream. In another still further implementation, the method includes loading the first subset and second subset into columns of an array having a predetermined number of columns; and reading a row of the array. In some implementations, the first subset of file does not include any consecutive bits of the file, while in other implementations, the first subset of the file does not include any consecutive bytes of the file. In still other implementations, the first subset of the file may not include any consecutive elements of the original file, where an element may be of any predetermined length (e.g. 1 bit, 1 byte, 4 bytes, 8 bytes, etc.). In some implementations, the synchronization client may also encrypt the first subset of the file, prior to transmission of the first subset of the file to the first cloud storage service; and encrypt the second subset of the file, prior to transmission of the second subset of the file to the first cloud storage service.

In another aspect, the present disclosure is directed to a system for obfuscation of data via an aggregation of cloud storage services. The system includes a client device, in communication with a plurality of cloud storage services, comprising a processor executing a synchronization client. The synchronization client is configured to identify a file for transfer to an aggregation of the plurality of a cloud storage services. The synchronization client is also configured to extract a first subset of the file comprising every $n^{th}$ element. The synchronization client is also configured to transmit the first subset of the file to a first cloud storage service of the plurality of cloud storage services. The synchronization client is also configured to extract a second subset of the file comprising every $n^{th}$ element, offset by one. The synchronization client is also configured to transmit the second subset of the file to a second cloud storage service of the plurality of cloud storage services, and transmit metadata of the file and an identification of the first subset, first cloud storage service, second subset, and second cloud storage service, to a third cloud storage service.

In some implementations, each element comprises a predetermined number of bits. In other implementations, the synchronization client is further configured to inverse multiplex a bitstream of the file into a plurality of subsets. In still other implementations, the synchronization client is further configured to load the file into an array having predetermined number of columns; and read a first column of the array. In a further implementation, the synchronization client is further configured to read a second column of the array.

In some implementations, the synchronization client is further configured to subsequently transmit a request for the file, to the third cloud storage service, the request comprising the metadata of the file; and receive, from the third cloud storage service, identifications of the first subset, first cloud storage service, second subset, and second cloud storage service. In a further implementation, the synchronization client is further configured to retrieve the first subset from the first cloud storage service; retrieve the second subset to the second cloud storage service; and assemble the file from the first subset and second subset. In a further implementation, the synchronization client is further configured to multiplex the first subset and second subset into a single bitstream. In some implementations, the synchronization client is further configured to load the first subset and second subset into columns of an array having a predetermined number of columns; and read a row of the array. In some implementations, the first subset of the file does not include any consecutive bits of the file, while in other implementations, the first subset of the file does not include any consecutive bytes of the file. In still other implementations, the first subset of the file may not include any consecutive elements of the original file, where an element may be of any predetermined length (e.g. 1 bit, 1 byte, 4 bytes, 8 bytes, etc.). In some implementations, the synchronization client may also be configured to encrypt the first subset of the file, prior to transmission of the first subset of the file to the first cloud storage service; and encrypt the second subset of the file, prior to transmission of the second subset of the file to the first cloud storage service.

Pipelined Processing of Files via Aggregated Cloud Storage Services

Some third-party cloud storage services provide enhanced features for certain types of files, such as geolocation, image analysis and tagging, facial recognition, image processing, etc. These features may be performed automatically on files of the corresponding type when synchronized to the cloud storage service. To leverage processing provided by a cloud provider with aggregation of cloud storage services, files may be pipelined to the processing provider and then resynchronized to an alternate storage service, with processing or metadata retained. For example, given a first cloud provider that provides enhanced processing for photos, but only provides 1 GB of storage; and a second cloud provider that does not provide enhanced processing, but provides unlimited photo storage, photos may be provided to the first cloud provider for processing. Once processed, the generated metadata may be retrieved from the first cloud provider, and the photo provided to the second cloud provider for storage. The photo may be removed from the first cloud provider, allowing additional photos to be transferred and processed, combining the benefits to the user and functionality of both the first provider and second provider.

In one implementation, files may be provided for processing, retrieved, and then separately provided for storage. In another implementation, files may be simultaneously provided for processing and storage at different cloud storage providers. After processing, the metadata of the file may be retrieved, and the file deleted from storage of the processing provider. The metadata may be synchronized with the stored file, or may be retained in metadata storage and retrieved by the client device during synchronization or file retrieval operations.

Figure 10:
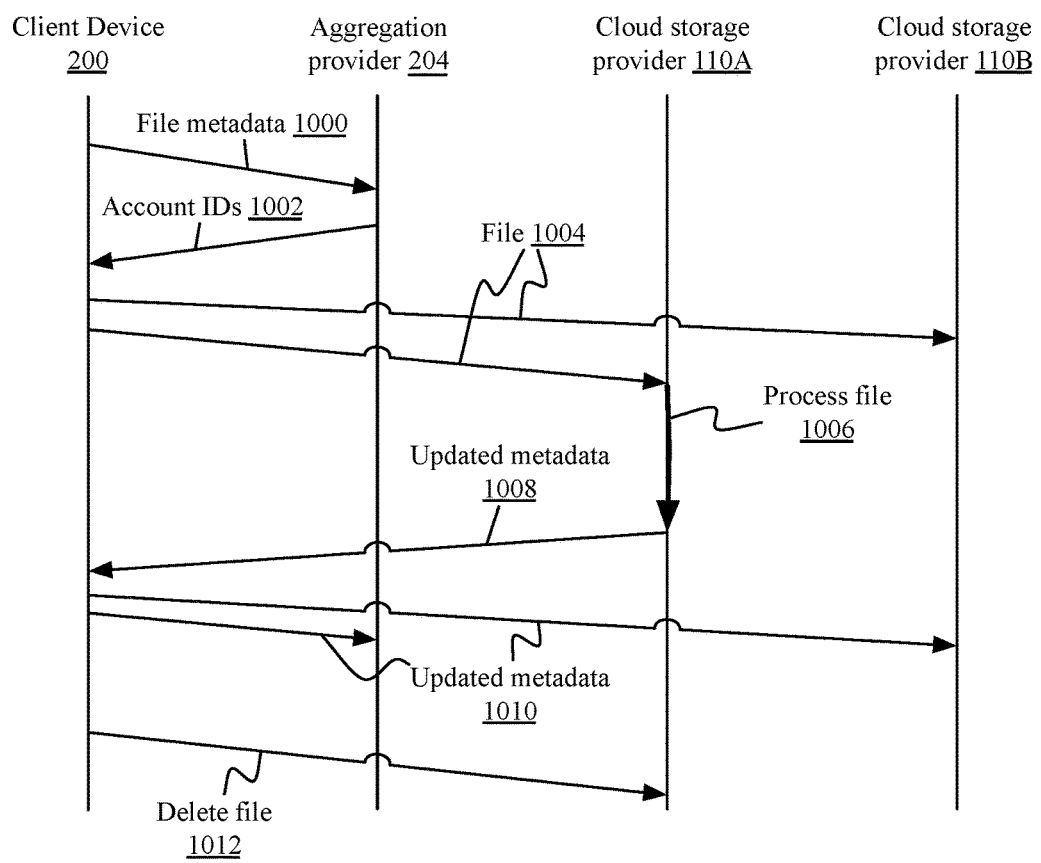
FIG. 10 is an illustration of signal flow of pipelined processing of files via aggregated cloud storage services.

For example, FIG. 10 is an illustration of signal flow of pipelined processing of files via aggregated cloud storage services. In some implementations, functions performed by the aggregation provider 204 may be provided by a synchronization client on client device 200.

At step 1000, file metadata of a file may be transmitted to the aggregation provider 204, as discussed above in connection with step 506 of FIGS. 5A-5D. The file metadata may include a file type, as well as a file name, hash result, file metadata, ID3 tags, and/or any other type and form of such information. The aggregation provider 204 may identify, based on the file type, a matching policy indicating that a cloud storage provider provides enhanced processing. The aggregation provider may identify an account identifier of an account at the cloud storage provider. The aggregation provider may also select a second cloud storage provider for storage of the file, and may identify an account identifier of an account at the second cloud storage provider. At step 1002, the aggregation provider 204 may provide both account identifiers to the client device.

Responsive to receipt of the account identifiers, at step 1004, the client device 200 may transmit the file to the first cloud storage provider 110A and, in some implementations, to the second cloud storage provider 110B. In other implementations, the client device 200 may transmit the file to the second cloud storage provider 110B with updated metadata obtained from the first cloud storage provider 110A (e.g. transmitting the file in addition to the metadata at step 1010).

Upon receipt of the file, the first cloud storage provider may apply processing at step 1006 and generate updated data and/or metadata (e.g. geotagging information, facial recognition information, processed thumbnails of an image, higher bitrate versions of audio or video files, etc.) for the file. At step 1008, the updated metadata and/or file may be transmitted to or synchronized with the file at the client device. The client device may transmit the updated metadata or data to the aggregation provider 204 for storage, and/or to the second cloud storage provider 110B, at step 1010. The client device may also transmit a command to delete the file at the first cloud storage provider 110A at step 1012. In some implementations, the client device may trigger steps 1010 and 1012 by moving a file from a monitored folder corresponding to the first cloud storage provider to a second monitored folder corresponding to the second cloud storage provider, triggering the synchronization client or synchronization applications of each cloud storage provider to delete or upload the file accordingly.

As discussed above, in some implementations, metadata may be generated for files provided to a first cloud storage provider. In other implementations, a cloud storage provider may replace a file, such as replacing a low bitrate audio file with a high bitrate audio file. In still other implementations, the cloud storage provider may modify a file, such as performing processing on the file (e.g. normalization of audio files, removal of "red eye" from photos or automatic white balancing or modifications of color, brightness, and contrast, etc.). In yet still other implementations, the cloud storage provider may perform analysis of files and return other metadata representative of a subset of the files, such as identifying all photos in a collection including photos of a specific person. Accordingly, generation of metadata may also include generating, modifying, replacing, or otherwise altering a file, group of files, information about the files or group of files, or other such steps.

Figure 11A:
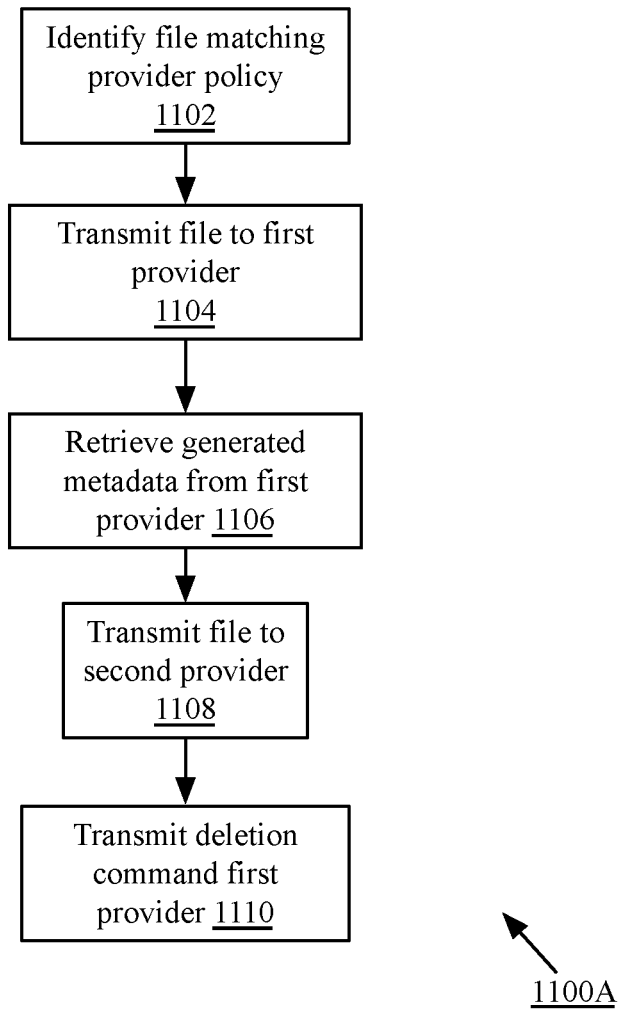
FIGS. 11A and 11B are flow charts of implementations of a method for pipelined processing of files via aggregated cloud storage services.

FIG. 11A is a flow chart of an implementation of a method 1100A for pipelined processing of files via aggregated cloud storage services. Upon identifying a new or modified file of a first file type, at step 1102, a synchronization client, aggregation provider, or storage manager may identify a first cloud storage provider having a policy matching the first file type, the policy indicating that the cloud storage provider will perform additional processing of the file and/or generate updated metadata for the file.

At step 1104, the client device may transmit the file to the first cloud storage provider. The cloud storage provider may perform the enhanced processing or upgrading of the file, as discussed above, and may indicate to the client device when processing is finished (e.g., by transmitting a ready signal, transmitting updated metadata to the device, etc.). At step 1106, the client device may receive or retrieve the updated metadata or enhanced file. Retrieval of the file may comprise transmitting a request to download the file and/or metadata, and receiving the file and/or metadata in response.

At step 1108, in some implementations, the client device may select a second cloud storage provider for long term storage of the file, using any of the methods discussed above in connection with FIGS. 4A-5D. The client device may transmit the file to the selected second cloud storage provider. As discussed above, in some implementations, this may comprise moving the file from a first monitored folder corresponding to the first cloud storage provider to a second monitored folder corresponding to the second cloud storage provider. Similarly, at step 1110, the client device may transmit a command to delete the file to the first cloud storage provider. In some implementations, this may be triggered as a result of moving the file from the first monitored folder.

Method 1100A may be performed iteratively for a plurality of files of the first type. Accordingly, in such implementations, the synchronization client or aggregation provider may maintain a queue of files for processing. In some implementations, files may be added to the queue as they are created.

Figure 11B:
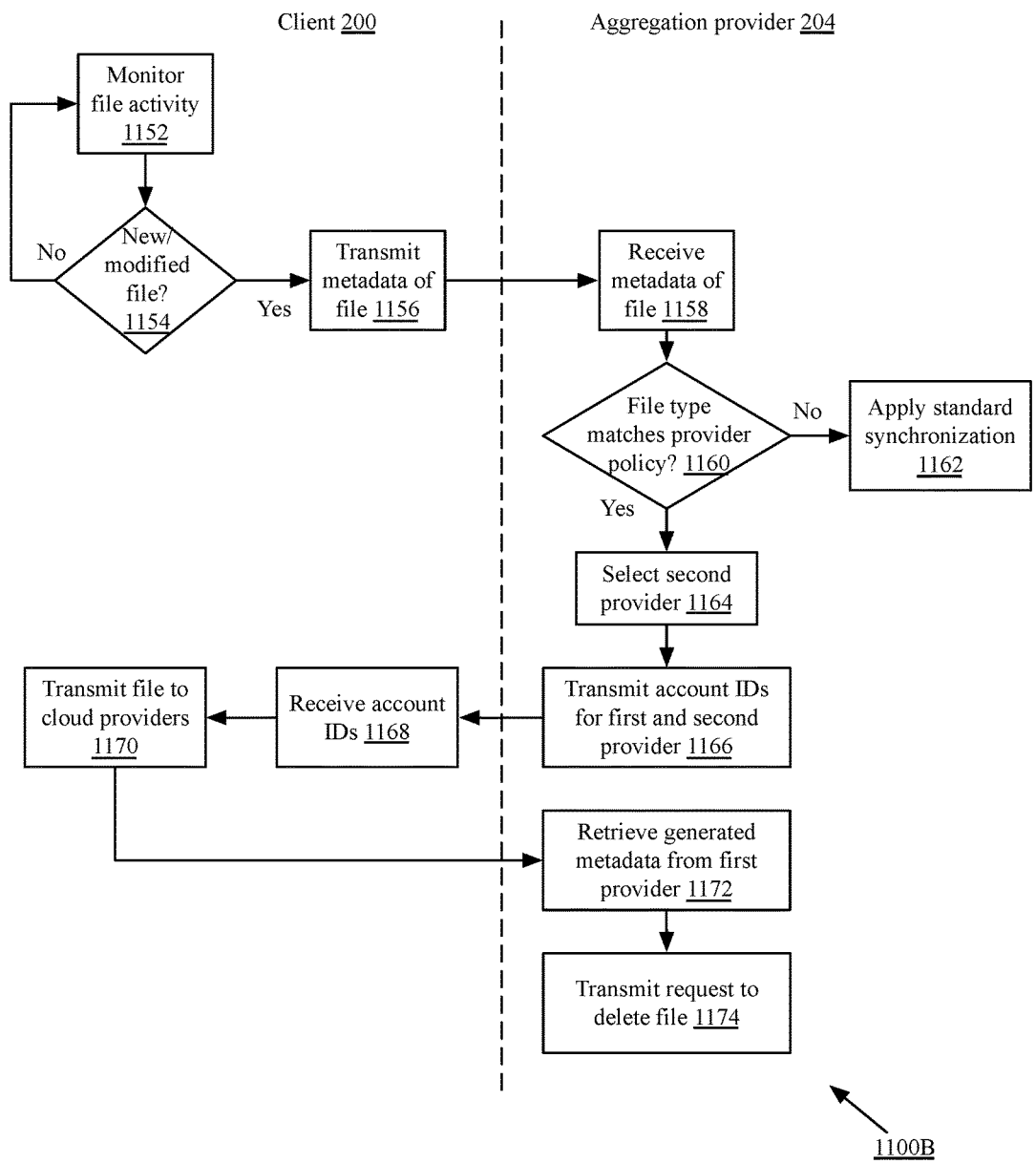

FIG. 11B is a flow chart of another implementation of a method 1100B for pipelined processing of files via aggregated cloud storage services. Although shown with some steps performed by an aggregation provider 204, in some implementations, one or more of these steps may be performed by the client 200.

Similar to file monitoring steps discussed above, at steps 1152 and 1154, a synchronization client or a file monitor of a client may periodically or continuously monitor one or more folders for new or modified files. Once found, at step 1156, metadata of the new or modified file may be transmitted to an aggregation provider. The metadata may include an identification of a file type of the file, in addition to other information (e.g. name, size, hash identifier, device identifier, etc.). The information may be received at step 1158, which may further include performing an authentication or handshaking procedure, as discussed above.

At step 1160, a storage manager of the aggregation provider may determine whether the first file type of the file matches a policy of a storage provider for which the client device has an associated account, the policy indicating that the provider will provide additional file processing. If not, then at step 1162, other synchronization methods may be performed, such as those discussed above in connection with FIGS. 4A-5D.

At the file type matches a policy for a first storage provider, then at step 1164, the storage manager may select a second cloud storage provider. The second cloud storage provider may be selected via any method discussed above, such as a provider for which files of the first type are not counted against a storage quota. The storage manager may retrieve account identifiers of accounts associated with the client device at the first and second cloud storage providers, and may transmit these identifiers to the client device at step 1166.

At step 1168, the client device may receive the identifiers, and at step 1170, may transmit the file to each of the first and second cloud storage providers. As discussed above, in some implementations, this may be done simultaneously or in sequence, while in other implementations, the client device may transmit the file to the second storage provider after receiving metadata or a processed file from the first cloud storage provider.

In some implementations, at step 1172, the storage manager or aggregation provider may retrieve generated metadata or an upgraded file from the first storage provider. Retrieving the metadata or file may comprise triggering the client device to request the metadata or file, and upon receipt, forward the metadata or file to the aggregation provider. In other implementations, the aggregation provider may retrieve the metadata or file directly from the first cloud storage provider.

At step 1174, the storage manager or aggregation provider may transmit a request to delete the file from the first storage provider. In some implementations, the request may be transmitted directly to the first storage provider, while in other implementations, the request may be transmitted to the client device, triggering the client device to transmit a similar request to the first storage provider.

Accordingly, in one aspect, the present disclosure describes a method for pipelined processing via an aggregation of cloud storage services. The method includes identifying, by a synchronization client or manager of a client device, a first file in storage of the client device. The method also includes transmitting, by the synchronization client, the first file to a first cloud storage service, the first cloud storage service generating new metadata for the first file. The method also includes retrieving, by the synchronization client, the generated metadata from the first cloud storage service. The method further includes transmitting, by the synchronization client, the first file to a second cloud storage service. The method also includes transmitting, by the synchronization client to the first cloud storage service, a request to delete the first file.

In some implementations of the method, identifying the first file further comprises identifying a new or modified file. In other implementations of the method, the generated metadata comprises geolocation metadata for the file. In still other implementations of the method, the generated metadata comprises facial recognition tagging metadata for the file.

In some implementations of the method, transmitting the first file to the first cloud storage service and second cloud storage service are performed prior to retrieving the generated metadata from the first cloud storage service. In some implementations, the method includes transmitting the generated metadata to the second cloud storage service for association with the first file. In other implementations, the method includes transmitting the generated metadata to a third cloud storage service.

In some implementations of the method, transmitting the request to delete the first file is performed responsive to retrieval, by the synchronization client, of the generated metadata for the first file. In other implementations, the method includes maintaining, by the synchronization client, a queue of files for transmission to the first cloud storage service. The method further includes, for each file of the queue of files: transmitting, by the synchronization client, said file to the first cloud storage service, the first cloud storage service generating new metadata for said file; retrieving, by the synchronization client, the generated metadata for said file from the first cloud storage service; and transmitting, by the synchronization client to the first cloud storage service, a request to delete said file.

In another aspect, the present disclosure describes a method for pipelined processing via an aggregation of cloud storage services. The method includes receiving, by a storage manager from a client device, an identification of a first file stored at the client device and designated for synchronization. The method also includes selecting, by the storage manager responsive to a file type of the first file, a first cloud storage provider. The method further includes transmitting, by the storage manager to the client device, an identification of the first cloud storage provider, receipt of the identification of the first cloud storage provider triggering the client device to transmit the first file to the first cloud storage provider, receipt of the first file triggering the first cloud storage provider to generate new metadata for the first file. The method also includes retrieving, by the storage manager from the first cloud storage provider, the generated metadata for the first file. The method further includes selecting, by the storage manager responsive to a storage policy associated with the client device, a second cloud storage provider; transmitting, by the storage manager to the client device, an identification of the second cloud storage provider, receipt of the identification of the second cloud storage provider triggering the client device to transmit the first file to the second cloud storage provider; and transmitting, by the storage manager to the first cloud storage provider, a request to delete the first file.

In some implementations, the method includes transmitting, by the storage manager, the generated metadata to the client device. In some implementations of the method, transmitting the request to delete the first file further comprises transmitting the request, by the storage manager, via the client device.

In another aspect, the present disclosure is directed to a system for pipelined processing via an aggregation of cloud storage services. The system includes a client device, comprising a storage device and a processor executing a synchronization client, the client device in communication with a plurality of cloud storage services. The synchronization client is configured for identifying a first file in the storage device; transmitting the first file to a first cloud storage service, the first cloud storage service generating new metadata for the first file; and retrieving the generated metadata from the first cloud storage service of the plurality of cloud storage services. The synchronization client is also configured for transmitting the first file to a second cloud storage service of the plurality of cloud storage services; and transmitting, to the first cloud storage service, a request to delete the first file.

In a further implementation, the synchronization client is further configured for identifying a new or modified file. In another further implementation, the generated metadata comprises geolocation metadata for the file or facial recognition tagging metadata for the file. In yet another further implementation, the synchronization client is further configured for transmitting the first file to the first cloud storage service and second cloud storage service prior to retrieving the generated metadata from the first cloud storage service. In still yet another further implementation, the synchronization client is further configured for transmitting the generated metadata to the second cloud storage service for association with the first file. In yet still another further implementation, the synchronization client is further configured for transmitting the generated metadata to a third cloud storage service. In another further implementation, the synchronization client is further configured for transmitting the request to delete the first file responsive to retrieval, by the synchronization client, of the generated metadata for the first file. In still another further implementation, the synchronization client is further configured for maintaining a queue of files for transmission to the first cloud storage service; and for each file of the queue of files: transmitting said file to the first cloud storage service, the first cloud storage service generating new metadata for said file; retrieving the generated metadata for said file from the first cloud storage service; and transmitting, by the synchronization client to the first cloud storage service, a request to delete said file.

Computing Devices

Figure 12:
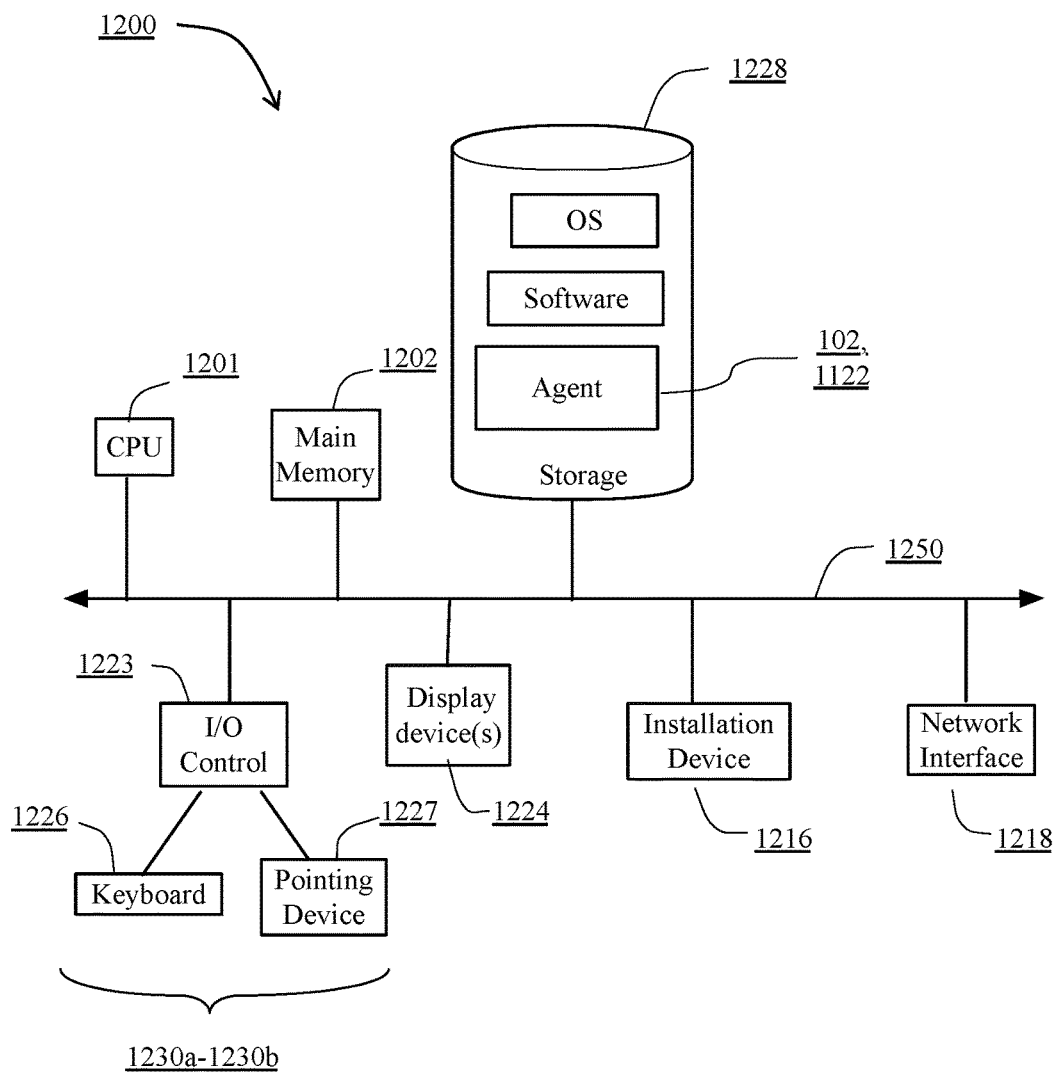
FIG. 12 is a block diagram of an exemplary computing device useful for practicing the methods and systems described herein.

FIG. 12 is a block diagram of an exemplary computing device useful for practicing the methods and systems described herein. The various devices 200, 204, 110 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 12 depicts a block diagram of a computing device 1200 useful for practicing an embodiment of the user devices 100 or device of an online storage or backup provider 114. A computing device 1200 may include a central processing unit 1201; a main memory unit 1202; a visual display device 1224; one or more input/output devices 1230a-1230b (generally referred to using reference numeral 1230), such as a keyboard 1226, which may be a virtual keyboard or a physical keyboard, and/or a pointing device 1227, such as a mouse, touchpad, or capacitive or resistive single- or multi-touch input device; and a cache memory 1240 in communication with the central processing unit 1201.

The central processing unit 1201 is any logic circuitry that responds to and processes instructions fetched from the main memory unit 1202 and/or storage 1228. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 1202 may be one or more memory chips capable of storing data and allowing any storage location to be directly accessed by the microprocessor 1201, such as random access memory (RAM) of any type. In some embodiments, main memory unit 1202 may include cache memory or other types of memory.

The computing device 1200 may support any suitable installation device 1216, such as a floppy disk drive, a CD-ROM drive, a CD-R/RW drive, a DVD-ROM drive, tape drives of various formats, USB/Flash devices, a hard-drive or any other device suitable for installing software and programs such as any backup agent or client agent 1220, a backup manager, or portion thereof. The computing device 1200 may further comprise a storage device 1228, such as one or more hard disk drives or redundant arrays of independent disks, for storing an operating system and other related software, and for storing application software programs such as any program related to the backup manager or backup agent 1220.

Furthermore, the computing device 1200 may include a network interface 1218 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 1218 may comprise a built-in network adapter, network interface card, PCMCIA network card, card bus network adapter, wireless network adapter, USB network adapter, cellular modem or any other device suitable for interfacing the computing device 1200 to any type of network capable of communication and performing the operations described herein.

A wide variety of I/O devices 1230a-1230n may be present in the computing device 1200. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 1230 may be controlled by an I/O controller 1223 as shown in FIG. 12. The I/O controller may control one or more I/O devices such as a keyboard 1226 and a pointing device 1227, e.g., a mouse, optical pen, or multi-touch screen. Furthermore, an I/O device may also provide storage 1228 and/or an installation medium 1216 for the computing device 1200. The computing device 1200 may provide USB connections to receive handheld USB storage devices such as the USB Flash Drive line of devices manufactured by Twintech Industry, Inc. of Los Alamitos, Calif.

The computing device 1200 may comprise or be connected to multiple display devices 1224a-1224n, which each may be of the same or different type and/or form. As such, any of the I/O devices 1230a-1230n and/or the I/O controller 1223 may comprise any type and/or form of suitable hardware, software embodied on a tangible medium, or combination of hardware and software to support, enable or provide for the connection and use of multiple display devices 1224a-1224n by the computing device 1200. For example, the computing device 1200 may include any type and/or form of video adapter, video card, driver, and/or library to interface, communicate, connect or otherwise use the display devices 1224a-1224n. A video adapter may comprise multiple connectors to interface to multiple display devices 1224a-1224n. The computing device 1200 may include multiple video adapters, with each video adapter connected to one or more of the display devices 1224a-1224n. Any portion of the operating system of the computing device 1200 may be configured for using multiple displays 1224a-1224n. Additionally, one or more of the display devices 1224a-1224n may be provided by one or more other computing devices, such as computing devices 1200a and 1200b connected to the computing device 1200, for example, via a network. These embodiments may include any type of software embodied on a tangible medium designed and constructed to use another computer's display device as a second display device 1224a for the computing device 1200. One ordinarily skilled in the art will recognize and appreciate the various ways and embodiments that a computing device 1200 may be configured to have multiple display devices 1224a-1224n.

A computing device 1200 of the sort depicted in FIG. 12 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 1200 may have different processors, operating systems, and input devices consistent with the device. For example, in one embodiment, the computer 1200 is an Apple iPhone or Motorola Droid smart phone, or an Apple iPad or Samsung Galaxy Tab tablet computer, incorporating multi-input touch screens. Moreover, the computing device 1200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for secure file management in an aggregation of cloud storage services for a client device in communication with a storage manager through a network, compromising:

displaying at the client device a folder that includes subfolders of stored items that are synchronized with corresponding stored items in respective storage locations of a plurality of cloud storage providers in communication with the client device through the network, wherein interaction with the folder on the client device designates files for synchronization;

receiving, by a storage manager from a client device, metadata of a file stored at the client device and designated for synchronization;

identifying, by the storage manager, a plurality of fragments of the file;

selecting, by the storage manager, a first account associated with the client device at a first cloud storage provider of a plurality of cloud storage providers and a second account associated with the client device at a second cloud storage provider of the plurality of cloud storage providers based on the metadata of the file;

selecting, by the storage manager, a first subset of the plurality of fragments of the file and a second subset of the plurality of fragments of the file;

storing, by the storage manager, the metadata of the file, an identification of the first subset and second subset, and an identification of the first account and second account in a storage device associated with the storage manager;

transmitting, by the storage manager to the client device, the identification of the first account and first subset of the plurality of fragments, receipt of the identification causing the client device to transmit the first subset of the plurality of fragments to the first cloud storage provider;

transmitting, by the storage manager to the client device, the identification of the second account and second subset of the plurality of fragments, receipt of the identification causing the client device to transmit the second subset of the plurality of fragments to the second cloud storage provider;

subsequently receiving, by the storage manager from the client device, a request for the file;

retrieving, by the storage manager, the metadata of the file, the identification of the first subset and second subset, and the identification of the first account and second account stored in the storage device, responsive to receipt of the request;

transmitting, by the storage manager to the client device, the identification of the first account and first subset of the plurality of fragments, receipt of the identification causing the client device to transmit a request for the first subset of the plurality of fragments to the first cloud storage provider; and transmitting, by the storage manager to the client device, the identification of the second account and second subset of the plurality of fragments, receipt of the identification causing the client device to transmit a request for the second subset of the plurality of fragments to the second cloud storage provider.

2. The method of claim 1, wherein identifying the plurality of fragments of the file further comprises dividing the file into a plurality of fragments of a predetermined size.

3. The method of claim 2, wherein dividing the file into a plurality of fragments of the predetermined size further comprises dividing the file into the plurality of fragments of the predetermined size and an additional fragment including a remainder of the file.

4. The method of claim 2, wherein the predetermined size is smaller than a header of the file.

5. The method of claim 1, wherein selecting the first subset of the plurality of fragments of the file and selecting the second subset of the plurality of fragments of the file further comprises distributing alternating fragments of the file to the first subset and second subset.

6. The method of claim 5, wherein receipt of the identification of the first account and first subset of the plurality of fragments further causes the client device to concatenate the first subset of the plurality of fragments of the file into a first contiguous block.

7. A system for secure file management in an aggregation of cloud storage services for a client device in communication with a storage manager through a network, compromising:
- a server comprising a network interface in communication with a client device and a plurality of cloud storage providers; and
- a processor executing a storage manager,
- wherein the client device is configured to display a folder that includes subfolders of stored items that are synchronized with corresponding stored items in respective storage locations of a plurality of cloud storage providers in communication with the client device through the network, wherein interaction with the folder on the client device designates files for synchronization, and
- wherein the storage manager is configured to:
- receive, from the client device, metadata of a file stored at the client device and designated for synchronization;
- identify a plurality of fragments of the file;
- select a first account associated with the client device at a first cloud storage provider of the plurality of cloud storage providers and a second account associated with the client device at a second cloud storage provider of the plurality of cloud storage providers based on the metadata of the file;
- select a first subset of the plurality of fragments of the file and a second subset of the plurality of fragments of the file;
- store the metadata of the file, an identification of the first subset and second subset, and an identification of the first account and second account in a storage device associated with the storage manager;
- transmit, to the client device, the identification of the first account and first subset of the plurality of fragments, receipt of the identification causing the client device to transmit the first subset of the plurality of fragments to the first cloud storage provider;
- transmit, to the client device, the identification of the second account and second subset of the plurality of fragments, receipt of the identification causing the client device to transmit the second subset of the plurality of fragments to the second cloud storage providers;
- subsequently receive, from the client device, a request for the file,
- retrieve the metadata of the file, the identification of the first subset and second subset, and the identification of the first account and second account stored in the storage device, responsive to receipt of the request,
- transmit, to the client device, the identification of the first account and first subset of the plurality of fragments, receipt of the identification causing the client device to transmit a request for the first subset of the plurality of fragments to the first cloud storage provider, and
- transmit, to the client device, the identification of the second account and second subset of the plurality of fragments, receipt of the identification causing the client device to transmit a request for the second subset of the plurality of fragments to the second cloud storage provider.

8. The system of claim 7, wherein the storage manager is further configured to divide the file into a plurality of fragments of a predetermined size.

9. The system of claim 8, wherein the storage manager is further configured to divide the file into the plurality of fragments of the predetermined size and an additional fragment including a remainder of the file.

10. The system of claim 8, wherein the predetermined size is smaller than a header of the file.

11. The system of claim 7, wherein the storage manager is further configured to distribute alternating fragments of the file to the first subset and second subset.

12. The system of claim 11, wherein receipt of the identification of the first account and first subset of the plurality of fragments further causes the client device to concatenate the first subset of the plurality of fragments of the file into a first contiguous block, concatenate the second subset of the plurality of fragments of the file into a second contiguous block, and concatenate the first contiguous block and the second contiguous block.

13. A method for secure file management in an aggregation of cloud storage services for a client device in communication with a storage manager through a network, compromising:
- displaying at the client device a folder that includes subfolders of stored items that are synchronized with corresponding stored items in respective storage locations of a plurality of cloud storage providers in communication with the client device through the network, wherein interaction with the folder on the client device designates files for synchronization; receiving, by a storage manager from a client device, metadata of a file stored at the client device and designated for synchronization;
- selecting, by the storage manager, a first account at a first cloud storage provider of a plurality of cloud storage providers and a second account at a second cloud storage provider of the plurality of cloud storage providers based on the metadata of the file;
- storing, by the storage manager, the metadata of the file and an identification of the first account and second account;
- transmitting, by the storage manager to the client device, the identification of the first account, receipt of the identification causing the client device to transmit a first subset of a plurality of fragments of the file to the first cloud storage provider;
- transmitting, by the storage manager to the client device, the identification of the second account, receipt of the identification causing the client device to transmit a second subset of the plurality of fragments of the file to the second cloud storage provider;
- subsequently receiving, by the storage manager from the client device, a request for the file;
- retrieving, by the storage manager, the metadata of the file, an identification of the first subset and second subset, and the identification of the first account and second account stored in the storage manager, responsive to receipt of the request;

transmitting, by the storage manager to the client device, the identification of the first account and first subset of the plurality of fragments, receipt of the identification causing the client device to transmit a request for the first subset of the plurality of fragments to the first cloud storage provider; and transmitting, by the storage manager to the client device, the identification of the second account and second subset of the plurality of fragments, receipt of the identification causing the client device to transmit a request for the second subset of the plurality of fragments to the second cloud storage provider.

14. The method of claim 13, further comprising dividing the file into a plurality of fragments of a predetermined size.

15. The method of claim 14, wherein dividing the file into a plurality of fragments of the predetermined size further comprises dividing the file into the plurality of fragments of the predetermined size and an additional fragment including a remainder of the file.

16. The method of claim 14, wherein the predetermined size is smaller than a header of the file.

17. The method of claim 13, further comprising distributing alternating fragments of the file to the first subset and second subset.

* * * * *